(12) United States Patent
Makuta et al.

(10) Patent No.: US 8,061,830 B2
(45) Date of Patent: *Nov. 22, 2011

(54) INK-JET RECORDING INK SET AND INK-JET RECORDING METHOD

(75) Inventors: Toshiyuki Makuta, Kanagawa (JP);
Masaaki Konno, Kanagawa (JP);
Yutaka Maeno, Kanagawa (JP);
Tsutomu Umebayasi, Kanagawa (JP);
Shigetomo Tsujihata, Kanagawa (JP);
Tetsuzo Kadomatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 939 days.

This patent is subject to a terminal disclaimer.

(21) Appl. No.: 11/724,306

(22) Filed: Mar. 15, 2007

(65) Prior Publication Data

US 2007/0216743 A1  Sep. 20, 2007

(30) Foreign Application Priority Data

Mar. 15, 2006 (JP) .................................. 2006-071708

(51) Int. Cl.
*C09D 11/00* (2006.01)

(52) U.S. Cl. ..................................... 347/100; 106/31.13

(58) Field of Classification Search .................. 347/100; 106/31.13
See application file for complete search history.

(56) References Cited

U.S. PATENT DOCUMENTS

| | | | |
|---|---|---|---|
| 4,245,029 A | 1/1981 | Crivello | |
| 6,543,872 B2 * | 4/2003 | Ohtsuka et al. | 347/19 |
| 6,727,295 B2 * | 4/2004 | Laksin et al. | 523/160 |
| 2003/0038869 A1 * | 2/2003 | Kaneko et al. | 347/100 |
| 2003/0044707 A1 | 3/2003 | Itabashi | |
| 2003/0052952 A1 * | 3/2003 | Tanabe et al. | 347/100 |
| 2004/0125185 A1 * | 7/2004 | Takada et al. | 347/100 |
| 2004/0137369 A1 | 7/2004 | Shimada | |
| 2004/0244641 A1 | 12/2004 | Takabayashi et al. | |
| 2004/0257419 A1 * | 12/2004 | Iinuma et al. | 347/100 |
| 2004/0259971 A1 | 12/2004 | Sasa | |
| 2005/0287476 A1 | 12/2005 | Ishkawa et al. | |
| 2006/0055088 A1 | 3/2006 | Nakayashiki et al. | |
| 2006/0071992 A1 * | 4/2006 | Sarkisian et al. | 347/100 |
| 2006/0178449 A1 | 8/2006 | Tsuchimura et al. | |
| 2006/0187285 A1 * | 8/2006 | Oyanagi et al. | 347/100 |
| 2007/0004823 A1 * | 1/2007 | Tsujihata | 523/160 |
| 2007/0076042 A1 | 4/2007 | Makuta et al. | |
| 2007/0076070 A1 * | 4/2007 | Makuta et al. | 347/100 |
| 2007/0229637 A1 * | 10/2007 | Makuta et al. | 347/100 |

FOREIGN PATENT DOCUMENTS

| | | |
|---|---|---|
| EP | 1 630 213 A1 | 3/2006 |
| EP | 1 650 269 A | 4/2006 |
| EP | 1 650 273 A | 4/2006 |
| EP | 1 688 467 A1 | 8/2006 |
| EP | 1 739 141 A | 1/2007 |
| EP | 1 783 184 A1 | 5/2007 |
| GB | 1 424 517 A | 2/1976 |
| JP | 63-60783 A | 3/1988 |
| JP | 8-174997 A | 7/1996 |
| JP | 8-218018 A | 8/1996 |
| JP | 8-247512 A | 9/1996 |
| JP | 8-247513 A | 9/1996 |
| JP | 11-129460 A | 5/1999 |
| JP | 11-254709 A | 9/1999 |
| JP | 2000-135781 A | 5/2000 |
| JP | 2001-348519 A | 12/2001 |
| JP | 2003012971 A * | 1/2003 |
| JP | 2003-214668 A | 7/2003 |
| JP | 2003-301127 A | 10/2003 |
| JP | 3478495 B2 | 10/2003 |
| JP | 2004018565 A | 1/2004 |
| JP | 2004-174948 A | 6/2004 |
| JP | 3642152 B2 | 2/2005 |
| JP | 2005-96254 A | 4/2005 |
| JP | 3642152 B2 | 4/2005 |
| JP | 2005-248009 A | 9/2005 |
| JP | 2006-162090 A | 6/2006 |
| WO | 2007/006636 A | 1/2007 |
| WO | 2007/006638 A | 1/2007 |

OTHER PUBLICATIONS

International Search Report issued Jan. 13, 2009 in International (PCT) Application No. PCT/JP/2008/002966 filed Oct. 20, 2008.
English translation of International Preliminary Report on Patentability and Written Opinion of the International Searching Authority, issued Jun. 1, 2010, in PCT/JP/2008/002966.
Japanese Patent Office Action in JP Application No. 2005-289361 mailed Aug. 18, 2009.

* cited by examiner

*Primary Examiner* — Laura Martin

(74) *Attorney, Agent, or Firm* — Sughrue Mion, PLLC

(57) ABSTRACT

The invention provides an ink-jet recording ink set including at least one first liquid A for at least forming an image and at least one second liquid B having a different composition from the composition of the first liquid A, wherein the first liquid A contains at least a polymer having a heterocyclic residue for forming a colorant, and a pigment, as well as an ink-jet recording method using the ink set.

17 Claims, No Drawings

INK-JET RECORDING INK SET AND INK-JET RECORDING METHOD

CROSS-REFERENCE TO RELATED APPLICATION

This application claims priority under 35 USC 119 from Japanese Patent Application No. 2006-71708, the disclosure of which is incorporated by reference herein. All publication, patent applications, and technical standards mentioned in this specification are herein incorporated by reference to the same extent as if each individual publication, patent application, or technical standard was specifically and individually indicated to be incorporated by reference.

BACKGROUND OF THE INVENTION

1. Field of the Invention

The invention relates to an ink-jet recording ink set and ink-jet recording method, particularly to an ink-jet recording ink set suitable for forming a high quality image at a high speed using a plurality of liquids, and an ink-jet recording method.

2. Description of the Related Art

An ink-jet method for ejecting an ink from an ink ejection port such as a nozzle has been used for many printers since the printer is small size and inexpensive and non-contact printing of images on a printing medium is possible. Among these ink-jet methods, a piezoelectric ink-jet method by which ink is ejected by utilizing deformation of a piezoelectric element and a thermal ink-jet method by which ink droplets are ejected by utilizing boiling of the ink by thermal energy are featured in high resolution and high printing speed.

However, it has been a currently important problem to attain high printing speed and high image quality in printing on a plain paper sheet or a water impermeable recording medium such as a plastic sheet by application of the ink droplets using an ink-jet printer.

In ink-jet recording, ink (liquid) droplets are continuously ejected in the order of droplet a1, droplet a2, droplet a3 and so on up to droplet ax, and a line or an image is formed on the recording medium with droplet a1, droplet a2, and droplet a3 and so on up to droplet ax. It was practical problems that the image tends to be blurred and neighboring ink droplets a1 and a2 are mixed when permeation of the droplets after application takes a long period of time, and sharp images are prevented from being formed. Neighboring droplets after application are fused when the droplets are mixed to each other, and the movement of the droplet occurs. Consequently, the position of the droplet shifts from the applied position to cause irregular line width when thin lines are printed or to cause irregular color development when a colored image is printed.

One of the methods for suppressing the image blurring and irregular line width is to enhance hardening of the ink. A proposed technology thereof is to harden and fix the ink by radiation, not by evaporation of the ink solvent. Another proposed technology is to use a two-liquid ink for making the image fine and precise, wherein both ink components are allowed to react on the recording medium. For example, Japanese Patent Application Laid-Open (JP-A) No. 63-60783 discloses a method comprising the steps of applying a liquid containing a basic polymer on the recording medium, and recording an image with an ink containing an anionic dye. JP-A No. 8-174997 discloses a method comprising the steps of applying a liquid composition containing a cationic substance on the recording medium, and applying an ink containing an anionic compound and a colorant. Japanese Patent Publication No. 3,478,495 discloses a method using a liquid containing a photocurable resin and another liquid containing a photopolymerization initiator.

However, while these methods exhibit a certain effect for suppressing the image blurring, they are insufficient for solving the problems of irregular line width and uneven color tone caused by mixing between the droplets. Since the ink used in these methods contains an aqueous solvent, drying speed of the ink is slow, and decrease of the image quality is apprehensive due to a tendency of uneven distribution of precipitated dyes.

JP-A No. 8-218018 discloses a technology related to the above-mentioned technologies, wherein a pigment is used as a colorant and the ink is hardened and fixed with radiation. In this method, a pixel is formed by using any one of an ink containing a solidifying monomer and an ink containing a pigment dispersion followed by forming a pixel at the same point as the previously formed image using the other ink, and the ink is fixed using a UV light or an electron beam.

JP-A 2001-348519 discloses a technology using an ink composition including water, a reaction monomer and a colorant, and a coagulating solution containing a coagulating agent for allowing the ink composition to form precipitates, and the ink composition is applied after applying the coagulating solution on the recording medium. Japanese Patent Publication No. 3,642,152 discloses a technology in which an ink composition containing a monomer is applied after applying a reaction solution containing a photopolymerization initiator on the entire surface of the recording medium followed by irradiation of a UV light.

In addition to the above-mentioned technologies, JP-A No. 2000-135781 discloses a technology in which two different inks are applied so as to overlap to each other.

SUMMARY OF THE INVENTION

The present invention has been made in view of the above circumstances and provides an ink-jet recording ink set and an ink-jet recording method.

A first aspect of the prevent invention provides an ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment.

A second aspect of the prevent invention provides an ink-jet recording method using an ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment, the method comprising applying the second liquid B on an area corresponding to the image to be formed on a recording medium with the first liquid A or an area wider than the area corresponding to the image, before application of the first liquid A.

DETAILED DESCRIPTION OF THE INVENTION

The ink-jet recording ink set and the ink-jet recording method using the same are described in detail below.

The ink-jet recording ink set of the invention includes at least one first liquid A for at least forming an image and at least one second liquid B having a different composition from the composition of the first liquid A, wherein the first liquid A contains at least a polymer having a heterocyclic residue for forming a colorant, and a pigment.

When only the technologies described in related arts are used, the application of droplets a1 and a2 so as to overlap in order to obtain a high image density causes a mixture of the neighboring droplets while they remain on a recording medium in a wet state, when, for example, the image is recorded using a impermeable or slow-permeable recording medium having a slow ink-absorbing rate. That is, the fusion of the neighboring droplets occurs. Consequently, it is difficult to solve the problems of irregular line width and mixing of colors (uneven colors).

Since the liquids having different compositions are mixed on the recording medium in the two-liquid ink system, the shock of the mixing of the droplets may cause dispersion breakage when dispersion of the components is not sufficient, especially a pigment dispersion agent is used in the components. The dispersion breakage affects the concentration of the image and the transparency of the image.

In the invention, droplets a1, a2 and so on of the first liquid A and droplets of the second liquid B having a different composition from that of the first liquid A are ejected from an ink ejection port (head) of the ink-jet printer to form a desired image. Dispersion breakage caused by the shock of collision and mixing of the droplets by application may be avoided by using a "polymer having a heterocyclic residue for forming a colorant" and a "pigment" in the fist liquid A when the ink is applied so that droplets such as droplet a1 and droplet a2 overlap to each other for obtaining a high image density. Thus, recording of high quality images with high density and excellent in transparency is possible without color mixing and color blurring.

Recording of images that maintain the shape of dots and have uniform line width is possible without stickiness and with excellent lubricity, light resistance and ozone resistance since the ink-jet recording ink set of the invention is composed of two-liquid ink system including the first liquid A and the second liquid B having different compositions to each other.

The first liquid A and the second liquid B constituting the ink-jet recording ink set of the invention will be described in detail below.

The first liquid A is formulated so as to have at least a composition for forming an image, and the second liquid B is formulated so that the composition is different from at least the composition of the first liquid A. The fist liquid A contains at least one polymer having a heterocyclic residue for forming a colorant and at least one pigment.

—Polymer having Heterocyclic Residue for Forming Colorant—

The polymer having heterocyclic residue for forming colorant (hereinafter, referred to as a "specified polymer of the invention") is used as a dispersion agent for improving dispersibility when a colorant such as a pigment described below is used. Since the colorant is favorably adsorbed to the polymer including the heterocyclic residue having high affinity with the colorant by van der Waals interaction, a stable dispersion state is obtained. Consequently, the polymer is effective for preventing color density from decreasing, transparency from decreasing, and the colors from being mixed and blurred, which are caused by dispersion breakage when ink droplets are applied for forming an image. Therefore, a high density and high quality image excellent in transparency can be recorded.

Examples of the colorant include pigments such as organic pigments, oil soluble dyes and water-soluble dyes, and the organic pigment is preferable. Specific examples of the organic pigment include phthalocyanine-based pigments, insoluble azo-based pigments, azo lake-based pigments, anthraquinone-based pigments, quinacridone-based pigments dioxazine-based pigments, diketopyrrolopyrrole-based pigments, anthrapyrimidine-based pigments, anthanthrone-based pigments, indanthrone-based pigments, flavanthrone-based pigments, perinone-based pigments, perylene-based pigments, thioindigo-based pigments and quinophthalone-based pigments. The specified polymer of the invention has a heterocyclic residue for forming these colorants. The quinacridone-based pigment, anthraquinone-based pigment, diketopyrrolopyrrole-based pigment, quinophthalone-based pigment and insoluble azo-based pigment are preferable among these pigments.

The heterocyclic ring of the heterocyclic residue preferably has at least a hydrogen bonding group in the molecule, and examples of them include thiophene, furan, xanthene, pyrrole, imidazole, isoindoline, isoindolinone, benzimidazolone, indole, quinoline, carbazole, acridine, acridone, quinacridone, anthraquinone, phthalimide, quinaldine and quinophthalone. Benzimidazolone, indole, quinoline, carbazole, acridine, acridone, anthraquinone and phthalimide are particularly preferable among them.

The specified polymer according to the invention is preferably a polymer containing a repeating unit represented by formula (1) below. The polymer compound containing the repeating unit described below enables the colorant to be stably dispersed by a steric repulsive effect between the colorant and polymer chains.

Formula (1)

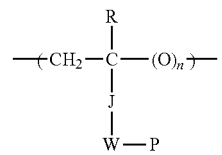

In the formula, R represents hydrogen atom or methyl group; J represents —C—, —COO—, —CONR$^1$—, —OCO—, a methylene group or a phenylene group; and R$^1$ represents hydrogen atom, alkyl group, aryl group or aralkyl group.

Examples of the alkyl group represented by R$^1$ include methyl group, ethyl group, n-propyl group, i-propyl group, n-butyl group, n-hexyl group, n-octyl group, 2-hydroxyethyl group, phenylmethyl group and phenylethyl group. Examples of the aryl group represented by R$^1$ include phenyl group. Examples of the aralkyl group represented by R$^1$ include benzyl group, phenethyl group, naphthylmethyl group and naphthylethyl group. Hydrogen atom, methyl group and ethyl group are preferable as R$^1$ among these groups.

J is preferably —COO—, —CONH— or a phenylene group.

W represents a single bond or divalent linking group. Examples of the divalent linking group include linear, branched or cyclic alkylene group, aralkylene group or arylene group, and these groups or a combination of these groups, or a combination with —NR$^2$—, —NR$^2$R—, —COO—, —OCO—, —O—, —SO$_2$NH—, NHSO$_2$—, —NHCOO— or —OCONH—. These groups may have substituents.

The alkylene groups represented by W are preferably alkylene groups having 1 to 10 carbon atoms, more preferably an alkylene groups having 1 to 4 carbon atoms. Examples of them include methylene group, ethylene group, propylene group, butylene group, pentylene group, hexylene group, octylene group and decylene group, and methylene group, ethylene group and propylene group are particularly preferable among them.

The aralkylene groups represented by W are preferably aralkylene groups having 7 to 13 carbon atoms, and examples of them include benzylidene group and cinnamylidene group.

The arylene groups represented by W are preferably arylene groups having 6 to 12 carbon atoms, and examples of them include phenylene group, cumenylene group, mesithylene group, tolylene group and xylylene group. Phenylene group is particularly preferable among them.

$R^2$ and $R^3$ each independently represents hydrogen atom or alkyl group, and hydrogen atom, methyl group, ethyl group and propyl group are favorable.

The single bond and alkylene group are particularly preferable among the linking groups represented by W, and methylene group, ethylene group and 2-hydroxypropylene group are also particularly preferable.

n denotes 0 or 1, preferably 0.

P in formula (1) represents a heterocyclic residue for forming a colorant. The colorant and the heterocyclic ring of the heterocyclic residue for forming a colorant are as have been described above, and preferable examples are also as have been described above.

The heterocyclic residue preferably resembles to the pigment used, and specific examples of the preferably used heterocyclic residue include acridone and anthraquinone for the quinacridone-based pigments.

Preferable specific examples of the repeating unit represented by formula (1) are described below (exemplified units M1 to M17). However, the invention is not restricted to these examples.

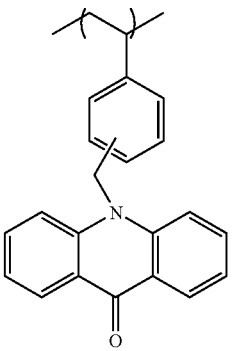
M-1

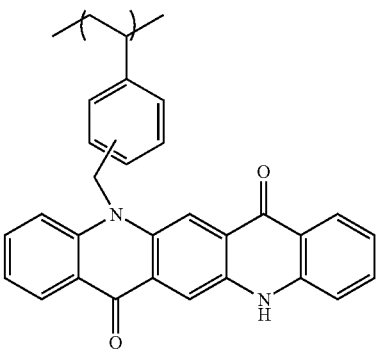
M-2

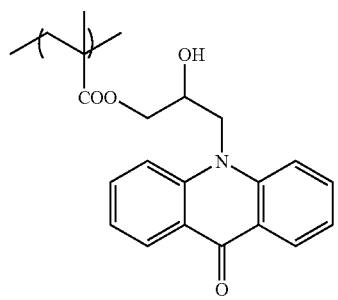
M-3

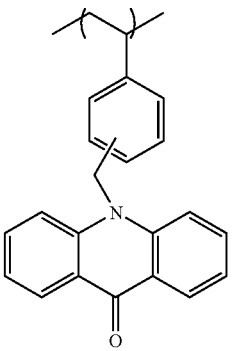
M-4

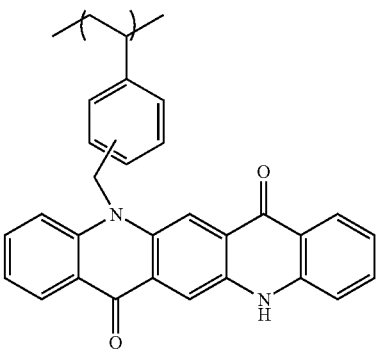
M-5

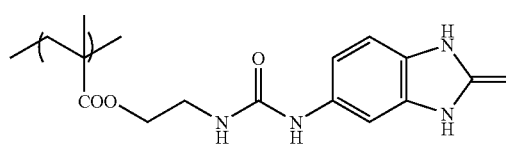
M-6

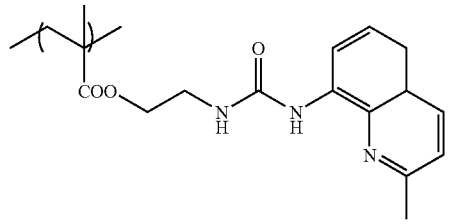
M-7

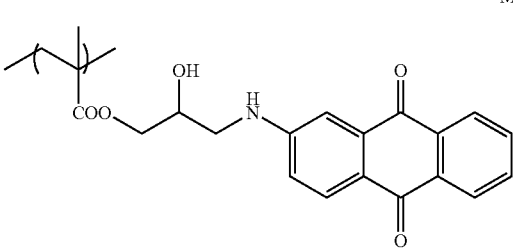
M-8

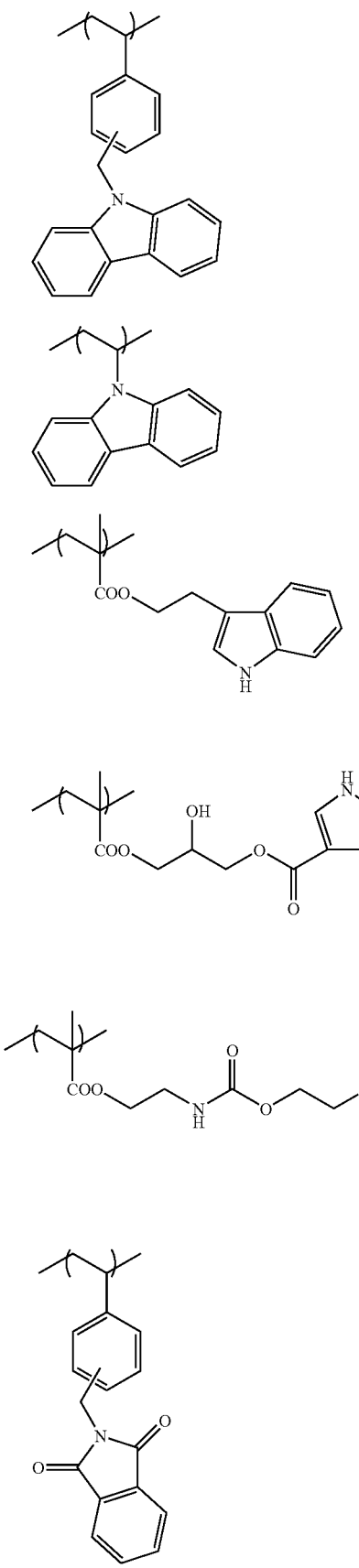

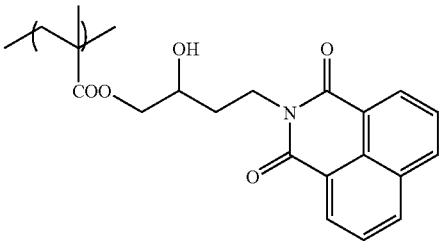

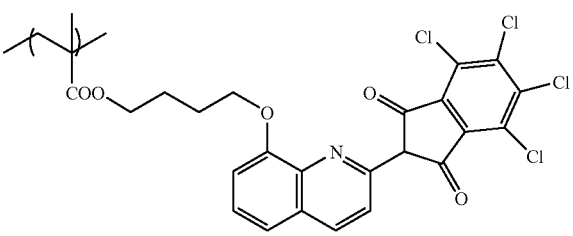

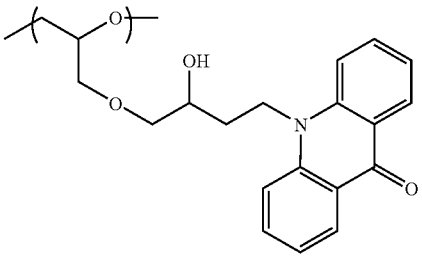

In particular, the specified polymer of the invention is preferably a graft copolymer containing a repeating unit derived from a polymerizable oligomer as a copolymerization unit by allowing the polymerizable oligomer having an ethylenic unsaturated double bond at a terminal thereof to further copolymerize. The polymerizable oligomer having such ethylenic unsaturated double bond at the terminal thereof is referred to a macro-monomer since it is a compound having a predetermined molecular weight (referred to "macro-monomer" hereinafter).

The polymerizable oligomer is composed of a polymer chain portion and a polymerizable functional group having the ethylenic unsaturated double bond at the terminal thereof. It is preferable for obtaining a desired graft polymer that the polymerizable functional group having the ethylenic unsaturated double bond is located only at one terminal.

Preferable examples of the polymerizable functional group having the ethylenic unsaturated double bond are (meth)acryloyl group and vinyl group, particularly (meth)acryloyl group.

The molecular weight of the macro-monomer is in the range of 1,000 to 10,000, more preferably 2,000 to 9,000, as a number average molecular weight (Mn) as converted into polystyrene.

The polymer chain portion is usually a homopolymer or a copolymer formed from at least one monomer selected from alkyl(meth)acrylate, styrene and derivatives thereof, acrylonitrile, vinyl acetate and butadiene, or polyethylene oxide, polypropylene oxide or polycaprolactone.

The polymerizable oligomer is preferably represented by formula (2) below.

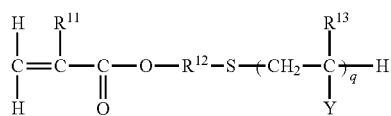

Formula (2)

In formula (2), $R^{11}$ and $R^{13}$ each independently represents hydrogen atom or methyl group.

$R^{12}$ represents alkylene group having 1 to 12 alkylene groups (preferably alkylene group having 2 to 4 carbon atoms that may have a substituent (for example hydroxyl group), and an ester bond, ether bond or amide bond may be contained in the alkylene group).

Y represents phenyl group or —$COOR^{14}$. The phenylene group may be substituted, and examples of the substituent include alkyl group having 1 to 4 carbon atoms (for example methyl or ethyl group). $R^{14}$ represents alkyl group having 1 to 10 carbon atoms (for example methyl, ethyl or benzyl group) or phenyl group. Y is preferably non-substituted phenyl group, or —$COOR^{14}$ in which $R^{14}$ is an alkyl group having 1 to 4 carbon atoms.

q denotes an integer of 20 to 200, preferably 25 to 150, and particularly 30 to 100.

Preferable examples of the polymerizable oligomer (macro-oligomer) include a polymer having one (meth)acryloyl group bonded at the one terminal of the poly methyl (meth)acrylate, poly n-butyl(meth)acrylate, poly i-butyl (meth)acrylate and polystyrene molecule. Examples of the commercially available polymerizable oligomer include polystyrene oligomer having methacryloyl group at one terminal (Mn=6,000, trade name AS-6, manufactured by TOA-GOSEI CO., LTD.), polymethyl methacrylate oligomer having methacryloyl group at one terminal ((Mn=6,000, trade name AA-6, manufactured by TOAGOSEI CO., LTD.), and poly n-butyl acrylate oligomer having methacryloyl group at one terminal ((Mn=6,000, trade name AB-6, manufactured by TOAGOSEI CO., LTD.).

The polymerizable oligomer preferably includes polymerizable oligomers represented by formula (3) as well as polymerizable oligomers represented by formula (2). These oligomers may be appropriately selected depending on polymerizable or crosslinkable compounds to be described below.

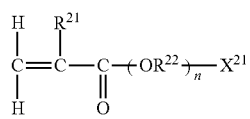

Formula (3)

$R^{21}$ in formula (3) represents hydrogen atom or methyl group, preferably methyl group.

$R^{22}$ represents alkylene group having 1 to 8 carbon atoms, preferably alkylene group having 1 to 6 carbon atoms, and more preferably alkylene group having 2 to 3 carbon atoms.

$X^{21}$ represents —$OR^{23}$ or —$OCOR^{24}$. $R^{23}$ and $R^{24}$ each independently represent hydrogen atom, alkyl group or aryl group. $R^{23}$ is preferably hydrogen atom, alkyl group having 1 to 18 carbon atoms, phenyl group or phenyl group substituted with alkyl group having 1 to 18 carbon atoms. $R^{24}$ is preferably alkyl group having 1 to 18 carbon atoms, more preferably alkyl group having 1 to 8 carbon atoms.

n denotes an integer of 2 to 200, preferably 5 to 100, and particularly 10 to 100.

Examples of the polymerizable oligomer represented by formula (3) include polyethyleneglycol mono(meth)acrylate, polypropylene glycol mono(meth)acrylate, polyethyleneglycol polypropylene glycol mono(meth)acrylate and polytetramethylene glycol monomethacrylate. They may be commercial products, or may be appropriately synthesized.

The polymerizable monomer represented by formula (3) is available as a commercial product as described above, and examples of the commercially available product include methoxypolyethylene glycol methacrylate (trade name: NK Ester M-40G, M-90G and M-230G, manufactured by TOA-GOSEI CO., LTD.; and trade name: Blenmer PME-100, PME-200, PME-400, PME-1000, PME-2000 and PME-4000, manufactured by NOF Corporation), polyethyleneglycol monomethacrylate (trade name: Blenmer PE-90, PE-200 and PE-350, manufactured by NOF Corporation), polypropylene glycol monomethacrylate (trade name: Blenmer PP-500, PP-800 and PP-1000, manufactured by NOF Corporation), polyethyleneglycol polypropylene glycol monomethacrylate (trade name: Blenmer 70PEP-370B, manufactured by NOF Corporation), polyethyleneglycol polytetramethylene glycol monomethacrylate (trade name: Blenmer 55PET-800, manufactured by NOF Corporation), and polypropylene glycol polytetramethylene glycol monomethacrylate (trade name: Blenmer NHK-5050, manufactured by NOF Corporation).

Since polymers having basic groups are liable to arise interaction by an acid-base reaction with an acidic pigment, it is particularly preferable that the specified polymer of the invention is a copolymer with a monomer having a nitrogen atom.

Preferable copolymerization components of the specified polymer of the invention are preferably represented by formula (4) below as the monomer including a nitrogen atom-containing group and ethylenic unsaturated double bond.

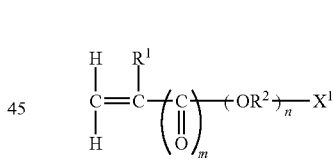

Formula (4)

In formula (4), $R^1$ represents hydrogen atom or methyl group. $R^2$ represents alkylene group having 1 to 12 carbon atoms, preferably alkylene group having 1 to 6 carbon atoms, and particularly alkylene group having 2 to 3 carbon atoms.

X1 represents —$NR^3R^4$, —$R^5$—$NR^6R^7$ or a basic nitrogen-containing heterocyclic group; $R^3$, $R^4$, $R^6$ and $R^7$ each independently represents hydrogen atom, alkyl group having 1 to 18 carbon atoms or aryl group having 6 to 18 carbon atoms; and $R^5$ represents alkylene group having 1 to 12 carbon atoms. The alkyl groups represented by $R^3$, $R^4$, $R^6$ and $R^7$ are preferably alkyl groups having 1 to 12 carbon atoms, particularly alkyl groups having 1 to 6 carbon atoms. The aryl groups represented by $R^3$, $R^4$, $R^6$ and $R^7$ are preferably aryl groups having 6 to 12 carbon atoms, particularly aryl groups having 6 to 10 carbon atoms. $R^5$ is preferably alkylene group having 1 to 6 carbon atoms, particularly alkylene group having 2 to 3 carbon atoms.

Examples of the basic nitrogen-containing heterocyclic group preferably include pyridyl group (particularly 1-pyridyl or 2-pyridyl group), piperidino group (particularly 1-piperidino group), pyrrolidyl group (particularly 2-pyrrolidyl group), pyrolidino group, imidazolino group or morpholino group (particularly 4-morpholino group), and pyridyl or imidazolino group is particularly preferable.

m and n each independently denotes an integer of 1 or 0.

The monomer represented by formula (4) is particularly a compound represented by any one of formulae (4-2) to (4-4).

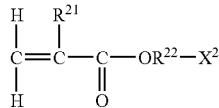

Formula (4-2)

In the formula, $R^{21}$ is the same as $R^1$ in formula (4), $R^{22}$ is the same as $R^2$ in formula (4), and $X^2$ is the same as $X^1$ in formula (4).

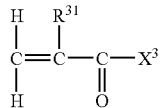

Formula (4-3)

In the formula, $R^{31}$ is the same as $R^1$ in formula (4), and $X^3$ is the same as $X^1$ in formula (4) [preferably $X^3$ is $—NR^{33}R^{34}$ ($R^{33}$ and $R^{34}$ are the same as $R^3$ and $R^4$, respectively, in formula (4)) or $—R^{35}—NR^{36}R^{37}$ ($R^{35}$, $R^{36}$ and $R^{37}$ are the same as $R^5$, $R^6$ and $R^7$, respectively, in formula (4))].

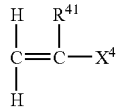

Formula (4-4)

In the formula, $R^{41}$ is the same as $R^1$ in formula (4), and $X^4$ represents pyrrolidino group, pyrrolidyl group, pyridyl group, piperidino group or morpholino group.

Preferable examples of the compound represented by formula (4) include N,N-dimethylaminoethyl(meth)acrylate, N,N-dimethylaminopropyl(meth)acrylate, 1-(N,N-dimethylamino)-1,1-dimethylmethyl(meth)acrylate, N,N-dimethylaminohexyl(meth)acrylate, N,N-diethylaminoethyl(meth)acrylate, N,N-diisopropylaminoethyl(meth)acrylate, N,N-di-n-butylaminoethyl(meth)acrylate, N,N-di-i-butylaminoethyl(meth)acrylate, morpholinoethyl(meth)acrylate, piperidinoethyl(meth)acrylate, 1-pyrrolidinoethyl(meth)acrylate, N,N-methyl-2-pyrrolidylaminoethyl(meth)acrylate, and N,N-methylphenylaminoethyl(meth)acrylate(meth-acrylates); dimethyl(meth)acrylamide, diethyl(meth)acrylamide, diisopropyl(meth)acrylamide, di-n-butyl(meth)acrylamide, di-i-butyl(meth)acrylamide, morpholino(meth)acrylamide, piperidino(meth)acrylamide, N-methyl-2-pyrrolidyl(meth)acrylamide, and N,N-methylphenyl(meth)acrylamide((meth)acrylamides); 2-(N,N-dimethylamino)ethyl(meth)acrylamide, 2-(N,N-diethylamino)ethyl(meth)acrylamide, 3-(N,N-diethylamino)propyl(meth)acrylamide, 3-(N,N-dimethylamino)propyl(meth)acrylamide, 1-(N,N-dimethylamino)-1,1-dimethylmethyl(meth)acrylamide, and 6-(N,N-diethylamino)hexyl(meth)acrylamide(aminoalkyl (meth)acrylamides); and vinyl pyridine.

In a preferable embodiment, the specified polymer of the invention includes other polymerizable monomers as copolymerization component. Examples of the other monomers include unsaturated carboxylic acids (for example (meth)acrylic acid, crotonic acid, itaconic acid, maleic acid and fumaric acid); aromatic vinyl compounds (for example styrene, α-methyl styrene, vinyl toluene, 2-vinyl pyridine, 4-vinyl pyridine and N-vinyl imidazole); (meth)acrylic acid alkyl esters (for example methyl(meth)acrylate, ethyl(meth)acrylate, n-butyl(meth)acrylate and i-butyl(meth)acrylate); (meth)acrylic acid alkylaryl esters (for example benzyl(meth)acrylate); (meth)acrylic acid substituted alkyl esters (for example glycidyl(meth)acrylate and 2-hydroxyethyl(meth)acrylate); carboxylic acid vinyl esters (for example vinyl acetate and vinyl propionate); vinyl cyanide (for example (meth)acrylonitrile and α-chloroacrylonitrile); and aliphatic conjugated dienes (for example 1,3-butadiene and isoprene). Unsaturated carboxylic acids, (meth)acrylic acid alkyl esters, (meth)acrylic acid alkylaryl esters and carboxylic acid vinyl esters are preferable among them.

It is particularly preferable that the specified polymer of the invention is a copolymer including the repeating unit represented by formula (1) and a unit derived from the polymerizable oligomer (macro-monomer); or a copolymer including the repeating unit represented by formula (1), a unit derived from the polymerizable oligomer (macro-monomer) and a unit derived from the monomer including a nitrogen atom-containing group.

The copolymer preferably contains the repeating unit represented by formula (1) in the range of 5 to 50% by mass (particularly 5 to 30% by mass) of the total repeating unit. In addition, the copolymer preferably contains the repeating unit derived from the polymerizable oligomer (macro-monomer) in the range of 30 to 80% by mass (particularly 50 to 80% by mass) of the total repeating unit, and a repeating unit derived from the monomer including a nitrogen atom-containing group in the range of 5 to 65% by mass (particularly 5 to 50% by mass) of the total repeating unit.

When the other polymerizable monomer is used, the copolymer preferably contains the repeating unit derived from the other polymerizable monomers in the range of 5 to 30% by mass of the total repeating unit.

The weight average molecular weight (Mw) of the specified polymer of the invention is preferably in the range of 1,000 to 200,000, particularly 10,000 to 100,000. The weight average molecular weight is a weight average molecular weight converted into polystyrene measured by gel permeation chromatography (carrier: tetrahydrofuran).

While examples of the graft copolymer [exemplified compounds 1 to 22] as the specified polymer of the invention are shown below, the invention is by no means restricted to these examples.

(1) a copolymer of a monomer that affords exemplified unit M-1/polymethyl methacrylate having methacryloyl group at one terminal (mass ratio 10:90);

(2) a copolymer of a monomer that affords exemplified unit M-1/polyethyleneglycol mono(meth)acrylate (mass ratio 15:85);

(3) a copolymer of a monomer that affords exemplified unit M-1/polycaprolactone having methacryloyl group at terminal (mass ratio 20:80);

(4) a copolymer of a monomer that affords exemplified unit M-4/polymethyl methacrylate having methacryloyl group at one terminal (mass ratio 10:90);

(5) a copolymer of a monomer that affords exemplified unit M-4/polyethyleneglycol mono(meth)acrylate (mass ratio 20:80)

(6) a copolymer of a monomer that affords exemplified unit M-4/polycaprolactone having methacryloyl group at terminal (mass ratio 25:75);

(7) a copolymer of a monomer that affords exemplified unit M-4/3-(N,N-dimethylamino)propyl acrylamide/polymethyl methacrylate having methacryloyl group at one terminal (mass ratio 10:20:70);

(8) a copolymer of a monomer that affords exemplified unit M-4/3-(N,N-dimethylamino)propyl acrylamide/polyethyleneglycol mono(meth)acrylate (mass ratio 15:25:60);

(9) a copolymer of a monomer that affords exemplified unit M-4/3-(N,N-dimethylamino)propyl acrylamide/polymethyl methacrylate having methacryloyl group at one terminal/polyethyleneglycol mono(meth)acrylate (mass ratio 8:22:50:20);

(10) a copolymer of a monomer that affords exemplified unit M-4/2-(N,N-dimethylamino)ethyl(meth)acrylate/polymethyl methacrylate having methacryloyl group at one terminal (mass ratio 8:42:50);

(11) a copolymer of a monomer that affords exemplified unit M-4/2-vinyl pyridine/polymethyl methacrylate having methacryloyl group at one terminal (mass ratio 20:30:50);

(12) a copolymer of a monomer that affords exemplified unit M-4/p-vinylbenzyl-N,N-dimethylamine/polyethyleneglycol mono(meth)acrylate (mass ratio 7:43:50);

(13) a copolymer of a monomer that affords exemplified unit M-4/3-(N,N-dimethylamino)ethyl(meth)acrylate/poly n-butyl methacrylate having methacryloyl group at one terminal (mass ratio 10:10:80);

(14) a copolymer of a monomer that affords exemplified unit M-4/styrene/polymethyl methacrylate having methacryloyl group at one terminal (mass ratio 15:15:70);

(15) a copolymer of a monomer that affords exemplified unit M-4/N,N-dimethyl acrylamide/polymethyl methacrylate having methacryloyl group at one terminal (mass ratios 20:10:70, and 5:25:70);

(16) a copolymer of a monomer that affords exemplified unit M-6/3-(N,N-dimethylamino)propyl acrylamide/polymethyl methacrylate having methacryloyl group (mass ratio 10:40:50);

(17) a copolymer of a monomer that affords exemplified unit M-6/3-(N,N-dimethylamino)propyl acrylamide/polyethyleneglycol mono(meth)acrylate (mass ratio 15:15:70);

(18) a copolymer of a monomer that affords exemplified unit M-6/3-(N,N-dimethylamino)propyl acrylamide/polymethyl methacrylate having methacryloyl group at one terminal (mass ratio 10:20:70);

(19) a copolymer of a monomer that affords exemplified unit M-13/3-(N,N-dimethylamino)ethyl(meth)acrylate/polymethyl methacrylate having methacryloyl group at one terminal (mass ratio 25:25:50);

(20) a copolymer of a monomer that affords exemplified unit M-13/4-vinyl pyridine/polymethyl methacrylate having methacryloyl group at one terminal (mass ratio 5:25:70);

(21) a copolymer of a monomer that affords exemplified unit M-13/3-(N,N-dimethylamino)ethyl(meth)acrylate/polyethyleneglycol mono(meth)acrylate (mass ratio 10:30:60); and

(22) a copolymer of a monomer that affords exemplified unit M-14/3-(N,N-dimethylamino)ethyl(meth)acrylate/polymethyl methacrylate having methacryloyl group at one terminal (mass ratio 15:25:60).

Such graft polymer can be obtained by radical polymerization of the polymerizable oligomer, monomers including a nitrogen atom-containing group and other monomers used in combination, if desired, in a solvent. While a radical polymerization initiator is usually used for polymerization, a chain transfer agent (for example 2-mercaptoethanol and dodecyl mercaptan) may be added together.

Only one or two or more kinds of polymers having a heterocyclic residue for forming a colorant may be used in combination in the ink-jet recording ink set of the invention.

The content of the polymer having a heterocyclic residue for forming a colorant in the fist liquid A constituting the ink-jet recording ink set is preferably 1 to 100% by mass, more preferably 2 to 80% by mass, and particularly preferably 5 to 50% by mass relative to the amount of the pigment. Dispersibility and stability of the fine pigment are improved and clear color tone and high coloring power are also significantly improved when the content is within the above-described range.

In the ink-jet recording ink set of the invention, a known dispersing agent for dispersing the pigment may be added together with the polymer having a heterocyclic residue for forming a colorant in a range not impairing the effect of the invention. The amount of addition of the known dispersing agent is preferably 50% by mass or less relative to the amount of the polymer having a heterocyclic residue for forming a colorant.

—Polymerizable or Crosslinkable Compound—

The first liquid A and the second liquid B may be favorably formulated by using at least one of the polymerizable or crosslinkable compounds, preferably using in the first liquid A. The polymerizable or crosslinkable compound functions for hardening by initiating a polymerization or crosslinking reaction by an initiating species generated from the polymerization initiator described below.

A known polymerizable or crosslinkable compound may be used for radical polymerization, cationic polymerization or dimerization reaction. Examples of the polymerizable or crosslinkable compound include addition polymerization compounds having at least one ethylenic unsaturated double bond, epoxy-based compounds, oxetane-based compounds, oxirane-based compounds, polymers having a maleimide group in the side chain, cinnamyl group having a photodimerizable unsaturated double bond adjacent to an aromatic core, and polymers having a cinnamylidene or chalcone group in the side chain. The addition polymerization compound having at least one ethylenic unsaturated double bond is more preferable, and compounds selected from those having at least one, more preferably two or more kinds of terminal ethylenic unsaturated bonds (monofunctional or polyfunctional compounds) are particularly preferable. Specific examples of them may be appropriately selected from those known in the art related to the industrial fields of the invention, and examples of them include chemical species such as monomers, prepolymers, that is to say, dimers, trimers and oligomers, or mixtures thereof, or copolymers thereof.

Various known polymerizable monomers such as cation polymerizable monomers and radical polymerizable monomers are particularly preferable, specifically compounds having acryloyl group, methacryloyl group, aryl group, vinyl group or internal double-bonding group (such as maleic acid), or compounds having epoxy group or oxetanyl group are preferable, and compounds having acryloyl group, methacryloyl group, epoxy group or oxetanyl group are preferable among them in terms of capability of causing a hardening reaction with a low energy.

Examples of the above-described multifunctional compound include vinyl group containing aromatic compounds, (meth)acrylates which are esters of a bivalent or higher valent alcohol and (meth)acrylic acid, (meth)acrylamides which are amides of a bivalent or higher valent amine and (meth)acrylic acid, polyester (meth)acrylate in which (meth)acrylic acid is introduced into an ester obtained by combining a polybasic acid with a bivalent alcohol or polycaprolactone, polyether (meth)acrylate in which (meth)acrylic acid is introduced into an ether obtained by combining an alkylene oxide with a polyvalent alcohol, epoxy (meth)acrylate obtained by introducing (meth)acrylic acid into an epoxy resin, or by reacting a bivalent or higher valent alcohol with a epoxy-containing monomer, urethane acrylates having urethane bonds, amino resin acrylates, acrylic resin acrylates, alkyd resin acrylates, spirane resin acrylates, silicone resin acrylates, reaction products of an unsaturated polyester and a photopolymerizable monomer, and reaction products of a wax and the above-described polymerizable monomer.

Among them, (meth)acrylate, polyester (meth)acrylate, polyether (meth)acrylate, epoxy acrylate, urethane acrylate, acrylic resin acrylate, silicone resin acrylate, and reaction products of an unsaturated polyester and the photopolymerizable monomer are preferable. Acrylate, polyester acrylate, polyether acrylate, epoxy acrylate, and urethane acrylate are particularly preferable.

In the present description, (meth)acrylic acid refers to both acrylic acid and methacrylic acid.

Specific examples of the above-described multifunctional compound include divinylbenzene, 1,3-butanediol diacrylate, 1,6-hexanediol diacrylate, pentaerythritol triacrylate, trimethylolpropane triacrylate, dipentaerythritol hexaacrylate, 1,6-acryloyl aminohexane, hydroxy pivalic acid ester neopentyl glycol diacrylate, polyester acrylate having (meth) acryloyl groups at the ends of the molecular chain of polyester compound which is produced by a dibasic acid and a divalent alcohol and has a molecular weight of 500 to 30000, polyethyleneglycol diacrylate, epoxy acrylates having a bisphenol (A, S, or F) skeleton and a molecular weight of 450 to 30000, epoxy acrylates containing a phenol novolak resin skeleton and having a molecular weight of 600 to 30000, reactants of a polyvalent isocyanate and a (meth)acrylic acid monomer having hydroxy groups, and having a molecular weight of 350 to 30000, and urethane modified products having urethane bonds within the molecule.

Examples of the monofunctional compound include (meth)acrylate, styrene, acrylamide, vinyl group-containing monomers (e.g., vinyl esters, vinyl ethers, and N-vinyl amides), and (meth)acrylic acid. Among them, (meth)acrylate, acrylamide, vinyl esters, and vinyl ethers are preferable, and (meth)acrylate and acrylamide are particularly preferable.

The polymerizable compound may be nonsubstituted or substituted. Examples of the possible substituent include a halogen atom, a hydroxy group, an amide group, and a carboxylic acid group.

Specific examples of the above-described monofunctional compound include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethyl aminopropyl acrylamide, N-butoxymethyl acrylamide, acryloyl morpholine, 2-hydroxyethylvinyl ether, N-vinyl formamide, N-vinyl acetamide, 2-cyclohexyl carbamoyloxyethyl acrylate, acrylates having a polybutyl acrylate moiety in an ester, and acrylates having a polydimethyl siloxane moiety in an ester.

Preferable examples of cation polymerizable monomers usable in the present invention include the epoxy compounds, vinyl ether compounds, and oxetane compounds described in JP-A No. 6-9714, JP-A No. 2001-31892, JP-A No. 2001-40068, JP-A No. 2001-55507, JP-A No. 2001-310938, JP-A No. 2001-310937 and JP-A No. 2001-220526.

Examples of the epoxy compounds include aromatic epoxides and alicyclic epoxides.

Examples of monofunctional epoxy compounds usable in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxycyclohexane carboxylate, 2-(3,4-epoxycyclohexyl-5,5-spiro-3,4-epoxy)cyclohexane-metha-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylene bis(3,4-epoxycyclohexane), dicyclopentadiene diepoxide, ethyleneglycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxy octane, and 1,2,5,6-diepoxy cyclooctane.

Among these epoxy compounds, aromatic epoxides and alicyclic epoxides are preferable since they are advantageous in respect of the curing rate. Alicyclic epoxides are particularly preferable.

Examples of monofunctional vinyl ethers usable in the invention include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of multifunctional vinyl ethers include: divinyl ethers such as ethylene glycol divinyl ether, diethylene glycol divinyl ether, polyethylene glycol divinyl ether, propylene glycol divinyl ether, butylene glycol divinyl ether, hexane diol divinyl ether, bisphenol A alkylene oxide divinyl ether, and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

From the viewpoint of curing properties, adhesion to a recording medium, and the surface hardness of an image formed, the vinyl ether compound is preferably a di- or trivinyl ether compound, particularly preferably a divinyl ether compound.

The oxetane compound usable in the invention refers to a compound having an oxetane ring. Such an oxetane compound may be selected arbitrarily from known oxetane compounds such as described in JP-A No. 2001-220526, JP-A No. 2001-310937, and JP-A No. 2003-341217. The compound having an oxetane ring usable in the ink composition of the invention is preferably a compound having 1 to 4 oxetane rings in its structure. By using such a compound, the viscosity of the ink composition can be maintained in a range which enables easy handling, and the ink after curing adheres strongly to the recording medium.

Examples of monofunctional oxetanes usable in the invention include 3-ethyl-3-hydroxymethyl oxetane, 3-(meth)allyloxymethyl-3-ethyl oxetane, (3-ethyl-3-oxetanylmethoxy) methyl benzene, 4-fluoro-[1-(3-ethyl-3 -oxetanylmethoxy) methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl) ether, 2-ethylhexyl(3-ethyl-3-oxetanylmethyl)ether, ethyldiethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl (3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl) ether.

Examples of multifunctional oxetanes include 3,7-bis(3-oxetanyl)-5-oxa-nonane, 3,3'-(1,3-(2-methylenyl)propanediylbis(oxymethylene))bis-(3-ethyloxetane), 1,4-bis [(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis (3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, and EO-modified bisphenol F (3-ethyl-3-oxetanylmethyl)ether.

Such compounds having oxetane rings are described in detail in columns "0021" to "0084" of JP-A 2003-341217 supra, and the compounds described therein can be preferably used in the present invention as well. Among the oxetane compounds usable in the present invention, a compound having one or two oxetane rings is preferable from the viewpoint of the viscosity and adhesiveness of the ink composition.

While cation polymerizable monomers may be used alone or in combination of two or more, at least one compound selected from oxetane compounds, and at least one compound selected from epoxy compounds and vinylether compounds are preferably used in combination from the viewpoint of effectively preventing shrinkage by polymerization.

The polymerizable or crosslinkable compounds may be used alone, or in combination of two or more.

The content of the polymerizable or crosslinkable compound in the first liquid A and/or the second liquid B is preferably in the range of 50 to 99.6% by mass, more preferably 70 to 99.0% by mass, and further preferably 80 to 99.0% by mass relative to the total solid content (mass) of each droplet.

The content of the polymerizable or crosslinkable compound in the droplet is preferably in the range of 20 to 98% by mass, more preferably 40 to 95% by mass, and particularly 50 to 90% by mass relative to the total mass of each droplet.

—Polymerization Iinitiator—

The first liquid A and the second liquid B can be favorably formulated using at least one polymerization initiator, preferably using in at least the second liquid B. The polymerization initiator generates initiating species such as radicals by applying an activating light, heat or both energies, and initiates and accelerates the polymerization or crosslinking reaction to harden the polymerizable or crosslinkable compound.

The polymerization initiator is desirably contained separately from the polymerizable compound from the viewpoints of securing storage stability of the first liquid A and the second liquid B. The first liquid A preferably contains the polymerizable or crosslinkable compound, while the second liquid B or other liquids preferably contain the polymerization initiator in the embodiment of the invention.

In the embodiment of polymerization, the polymerization initiator is preferably a radical polymerization initiator or cation polymerization initiator, more preferably photopolymerization initiator.

The polymerization initiator in the invention is a compound that is changed chemically through the action of light or an interaction with a sensitizing dye put in an electron excited state to produce at least one of a radical, an acid and a base. Particularly, the polymerization initiator used in the invention is preferably the photo-radical initiator or a photo-acid generator from the viewpoint of initiating polymerization by such a simple means as exposure.

The photopolymerization initiator may be selected appropriately from initiators having sensitivity to the activated ray for irradiation, such as UV ray at 400 to 200 nm, far UV ray, g-line, h-line, i-line, KrF excimer laser light, ArF excimer laser light, electron ray, X-ray, molecular beam, or ion beam.

Specifically, any of common photopolymerization initiators known in the art may be used. Specific examples thereof are described, for example, in Bruce M. Monroe et al., Chemical Revue, 93, 435 (1993); R, S. Davidson, Journal of Photochemistry and biology, A: Chemistry, 73, 81 (1993); J. P. Faussier, "Photoinitiated Polymerization-Theory and Applications": Rapra Review vol. 9, Report, Rapra Technology (1998); and M. Tsunooka et al., Prog. Polym. Sci., 21, 1 (1996), the disclosures of which are incorporated herein by reference. Many compounds favorably used in chemical-amplification photoresists and for photocationic polymerization are also described in Japanese Research Association for Organic Electronics Materials Ed., "Organic Materials for Imaging" (published by Bun-Shin Shuppan (1993), pp. 187 to 192), the disclosure of which is incorporated herein by reference. The compounds that undergo oxidative or reductive bond cleavage through the interaction with the electronically-excited state of sensitizing dye are also known, and described, for example in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980), the disclosures of which are incorporated herein by reference.

Preferable examples of such photopolymerization initiators include (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (i) active ester compounds, and (j) compounds containing a carbon-halogen bond.

Preferable examples of the aromatic ketones (a) include the compounds each having a benzophenone or thioxanthone skeleton described, for example in "Radiation Curing in Polymer Science and Technology" J. P. Fouassier and J. F. Rabek (1993), pp. 77 to 117, the disclosure of which is incorporated herein by reference. More preferable examples of the aromatic ketones (a) include the α-thio benzophenone compounds described in Japanese Patent Application Publication (JP-B) No. 47-6416 (the disclosure of which is incorporated herein by reference); the benzoin ether compounds described in JP-B No. 47-3981 (the disclosure of which is incorporated herein by reference); the α-substituted benzoin compounds described in JP-B No. 47-22326 (the disclosure of which is incorporated herein by reference); the benzoin derivatives described in JP-B No. 47-23664 (the disclosure of which is incorporated herein by reference); the aroyl phosphonic acid esters described in Japanese Patent Application Laid-Open (JP-A) No. 57-30704 (the disclosure of which is incorporated herein by reference); the dialkoxybenzophenones described in JP-B No. 60-26483 (the disclosure of which is incorporated herein by reference); the benzoin ethers described in JP-B No. 60-26403 and JP-A No. 62-81345 (the disclosures of which are incorporated herein by reference); the α-amino benzophenones described in JP-B No. 1-34242, U.S. Pat. No. 4,318, 791, and EP Patent No. 0284561A1 (the disclosures of which are incorporated herein by reference); p-di(dimethylaminobenzoyl)benzene described in JP-A No. 2-211452 (the disclosure of which is incorporated herein by reference); the thio-substituted aromatic ketones described in JP-A No. 61-194062 (the disclosure of which is incorporated herein by reference); the acylphosphine sulfides described in JP-B No. 2-9597 (the disclosure of which is incorporated herein by reference); the acylphosphines described in JP-B No. 2-9596 (the disclosure of which is incorporated herein by reference); the thioxanthones described in JP-B No. 63-61950 (the disclosure of which is incorporated herein by reference); and the coumarins described in JP-B No. 59-42864 (the disclosure of which is incorporated herein by reference).

Examples of the aromatic onium salt compounds (b) include aromatic onium salts of the elements in Groups V, VI and VII in the periodic table, specifically, aromatic onium salts of N, P, As, Sb, Bi, O, S, Se, Te, and I. Preferable examples thereof include the iodonium salts described in EP Patent No. 104143, U.S. Pat. No. 4,837,124, and JP-A Nos. 2-150848 and 2-96514 (the disclosures of which are incorporated herein by reference); the sulfonium salts described in EP Patent Nos. 370693, 233567, 297443, 297442, 279210, and 422570 and U.S. Pat. Nos. 3,902,144, 4,933,377, 4,760, 013, 4,734,444, and 2,833,827 (the disclosures of which are incorporated herein by reference); diazonium salts (e.g., benzene diazonium salts which may have one or more substituted groups); diazonium salt resins (e.g., formaldehyde resins of diazo diphenylamine); N-alkoxypyridinium salts (e.g., those described in U.S. Pat. No. 4,743,528, JP-A Nos. 63-138345, 63-142345, and 63-142346, and JP-B No. 46-42363 (the disclosures of which are incorporated herein by reference), and specifically, 1-methoxy-4-phenylpyridinium tetrafluoroborate, etc.); and the compounds described in JP-B Nos. 52-147277, 52-14278, and 52-14279 (the disclosures of which are incorporated herein by reference). The aromatic onium salt compound (b) generates a radical or an acid as an active species.

Examples of the organic peroxides (c) include almost all organic compounds having one or more oxygen-oxygen bonds in the molecule; and preferable examples thereof include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl) benzophenone, 3,3',4,4'-tetra-(t-octylperoxycarbonyl) benzophenone, 3,3',4,4'-tetra-(cumylperoxycarbonyl) benzophenone, 3,3',4,4'-tetra-(p-isopropylcumylperoxycarbonyl)benzophenone, and di-t-butyl diperoxyisophthalate.

Examples of the hexaarylbiimidazole compounds (d) include the Rofin dimers described in JP-B Nos. 45-37377 and 44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o-,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o-,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis (o-trifluorophenyl)-4,4',5,5'-tetraphenylbiimidazole.

Examples of the ketoxime ester compounds (e) include 3-benzoyloxyiminobutan-2-one, 3-acetoxyiminobutan-2-one, 3-propionyloxyiminobutan-2-one, 2-acetoxyiminopentane-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compounds (f) as examples of other photopolymerizable initiator of the invention include the compounds described in U.S. Pat. Nos. 3,567,453 and 4,343, 891, and EP Patent No. 109,772 and 109,773 (the disclosures of which are incorporated herein by reference).

Examples of the azinium compounds (g) as examples of other photopolymerizable initiator of the invention include the compounds containing an N—O bond described in JP-A Nos. 63-138345, 63-142345, 63-142346, and 63-143537, and JP-B No. 46-42363, the disclosures of which are incorporated herein by reference.

Examples of the metallocene compounds (h) as examples of other photopolymerizable initiator of the invention include the titanocene compounds described in JP-A Nos. 59-152396, 61-151197, 63-41484, 2-249, and 2-4705 (the disclosures of which are incorporated herein by reference) and the iron-allene complexes described in JP-A Nos. 1-304453 and 1-152109 (the disclosures of which are incorporated herein by reference).

Specific examples of the titanocene compounds include di-cyclopentadienyl-Ti-dichloride, dicyclopentadienyl-Ti-bisphenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-bis-2,4-difluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyr-1-yl)phenyl)titanium, bis(cyclopentadienyl)bis[2,6-difluoro-3-(methyl sulfonamide)phenyl]titanium, and bis (cyclopentadienyl)bis [2,6-difluoro-3-(n-butylbiaroyl-amino)phenyl)titanium.

Examples of the active ester compounds (i) include the nitrobenzylester compounds described in EP Patent Nos. 0290750, 046083, 156153, 271851, and 0388343, U.S. Pat. Nos. 3,901,710 and 4,181,531, and JP-A Nos. 60-198538 and 53-133022 (the disclosures of which are incorporated herein by reference); the iminosulfonate compounds described in EP Patent Nos. 0199672, 84515, 199672, 044115, and 0101122, U.S. Pat. Nos. 4,618,564, 4,371,605 and 4,431,774, and JP-A Nos. 64-18143, 2-245756, and 4-365048 (the disclosures of which are incorporated herein by reference); and the compounds described in JP-B Nos. 62-6223 and 63-14340, and JP-A No. 59-174831 (the disclosure of which is incorporated herein by reference).

Preferable examples of the compounds (j) containing carbon-halogen bonds include the compounds described in Wakabayashi et al., Bull. Chem. Soc, Japan, 42, 2924 (1969) (the disclosure of which is incorporated herein by reference); the compounds described in British Patent No. 1388492 (the disclosure of which is incorporated herein by reference); the compounds described in JP-A No. 53-133428 (the disclosure of which is incorporated herein by reference); and the compounds described in German Patent No. 3337024 (the disclosure of which is incorporated herein by reference).

Further examples include the compounds described in F. C. Schaefer et al., J. Org. Chem. 29, 1527 (1964) (the disclosure of which is incorporated herein by reference); the compounds described in JP-A No. 62-58241 (the disclosure of which is incorporated herein by reference); the compounds described in JP-A No. 5-281728 (the disclosure of which is incorporated herein by reference); as well as the compounds described in German Patent No. 2641100 (the disclosure of which is incorporated herein by reference); the compounds described in German Patent No. 3333450 (the disclosure of which is incorporated herein by reference); the compounds described in German Patent No. 3021590 (the disclosure of which is incorporated herein by reference); and the compounds described in German Patent No. 3021599 (the disclosure of which is incorporated herein by reference).

Preferable specific examples of the compounds represented by (a) to (j) are shown below:

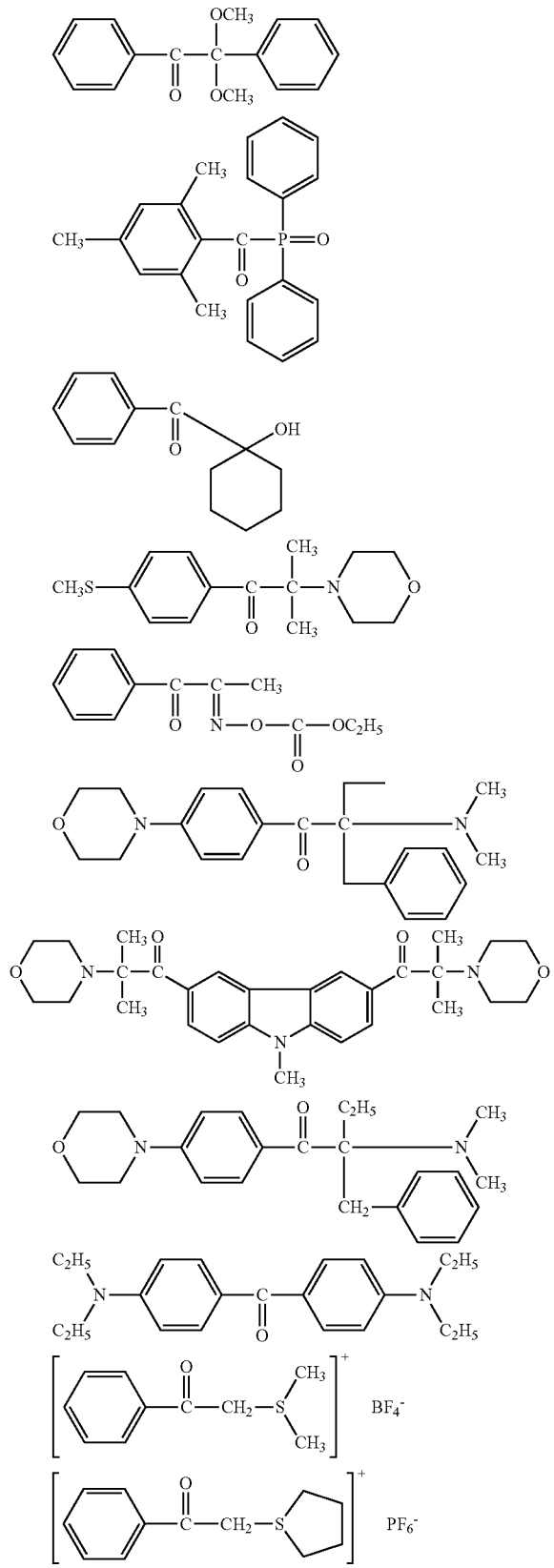

-continued
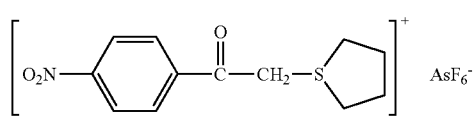 AsF$_6^-$
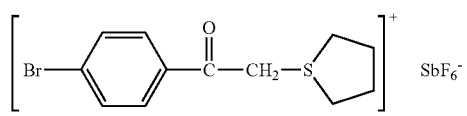 SbF$_6^-$
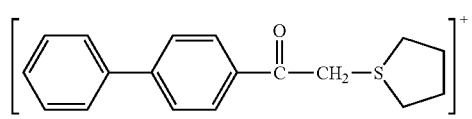 FeCl$_6^-$
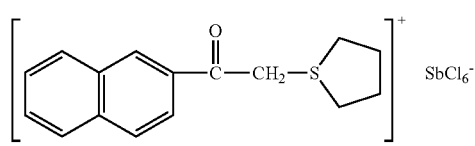 SbCl$_6^-$
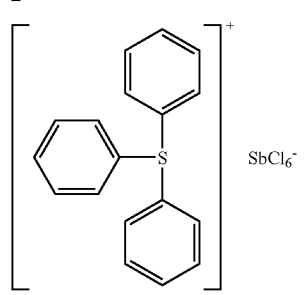 SbCl$_6^-$
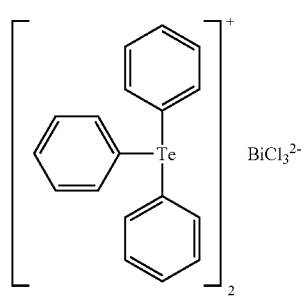 BiCl$_3^{2-}$
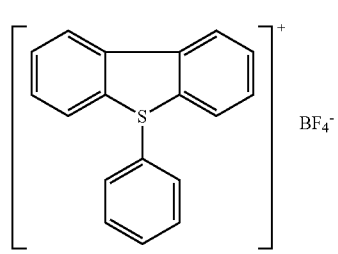 BF$_4^-$
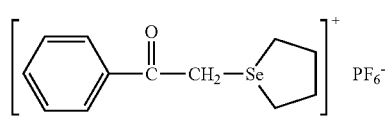 PF$_6^-$
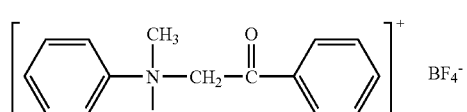 BF$_4^-$
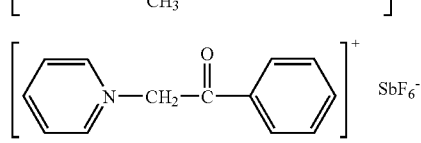 SbF$_6^-$
-continued
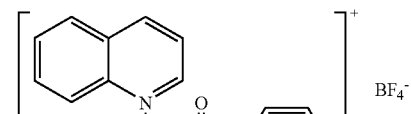 BF$_4^-$
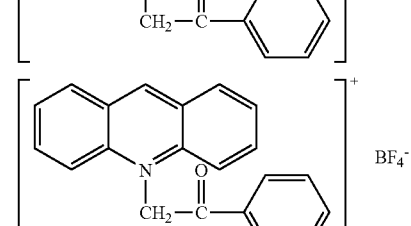 BF$_4^-$
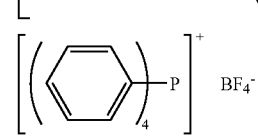 BF$_4^-$
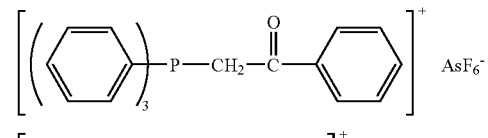 AsF$_6^-$
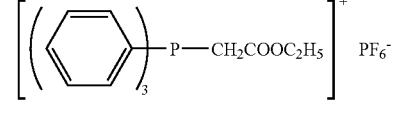 PF$_6^-$
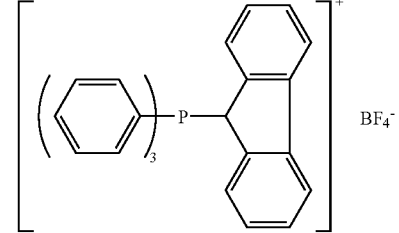 BF$_4^-$
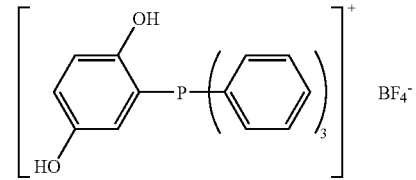 BF$_4^-$
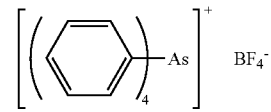 BF$_4^-$
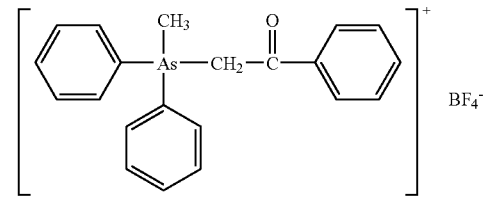 BF$_4^-$
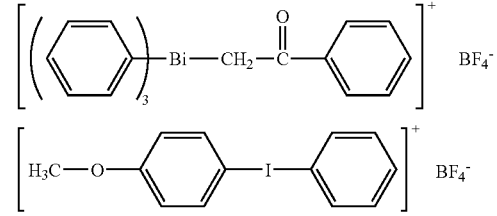 BF$_4^-$
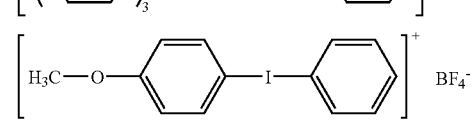 BF$_4^-$

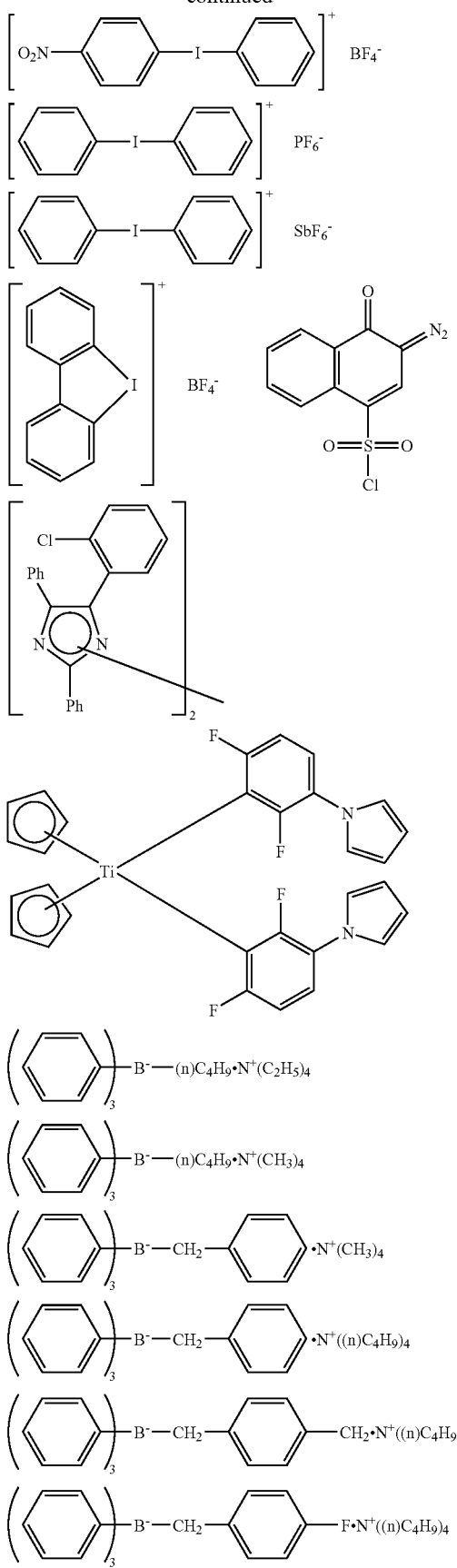
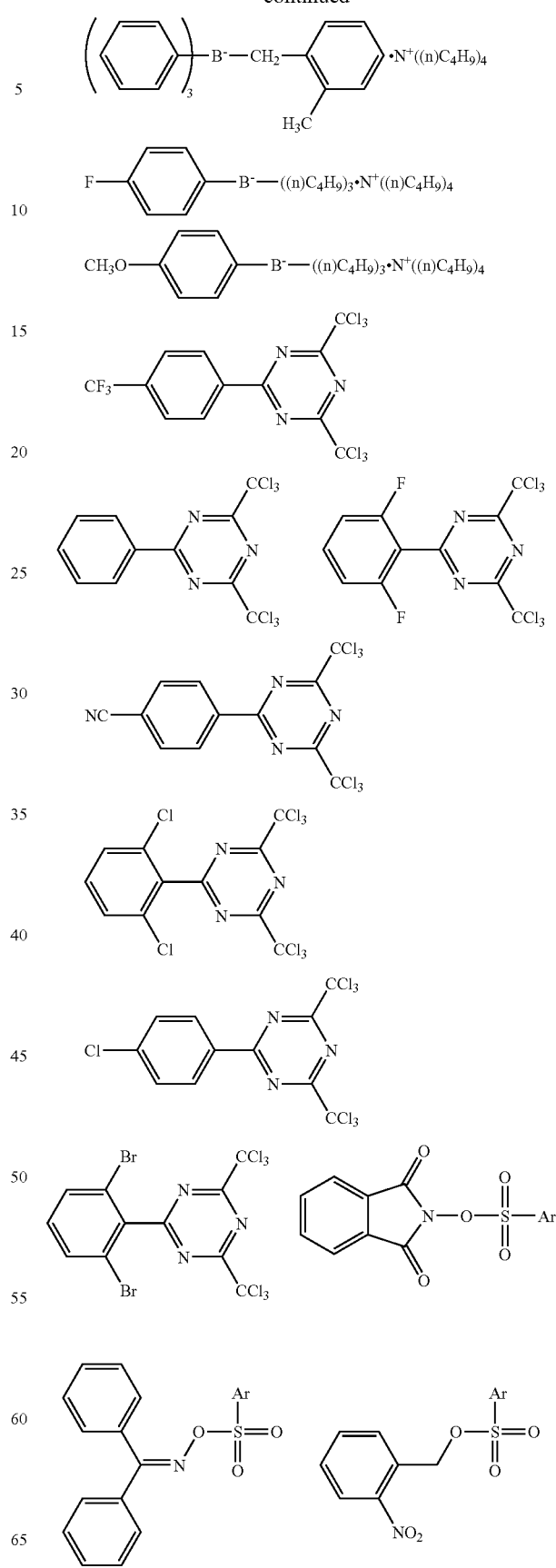

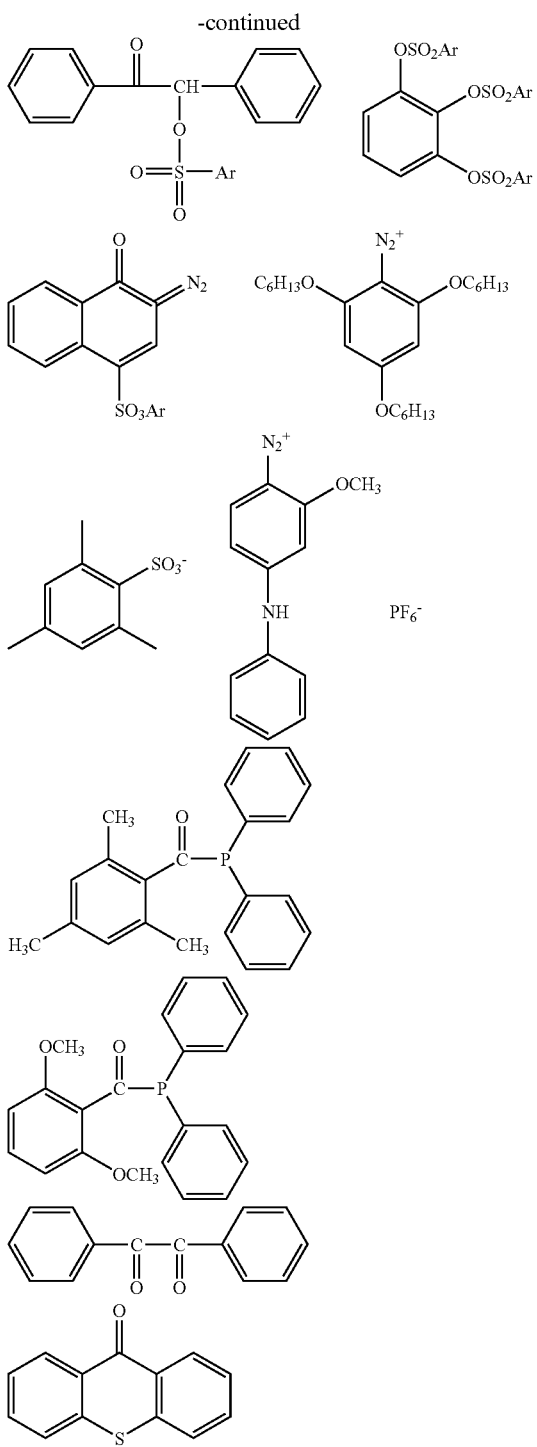

While the polymerization initiator is preferably excellent in sensitivity, it is not preferable that the initiator is heat-decomposed at a temperature of 80° C. or less from the viewpoint of storage stability. Therefore, the initiator not decomposed at a temperature below 80° C. is preferably selected.

The polymerization initiators may be used alone, or in combination of two or more. A known sensitizer may be used for improving sensitivity in the range not impairing the effect of the invention.

The content of the polymerization initiator in the second liquid B is preferably in the range of 0.5 to 20% by mass, more preferably 1 to 15% by mass, and particularly 3 to 10% by mass relative to the amount of the polymerizable compound applied per unit area, when a maximum amounts of the first liquid A and the second liquid B necessary for forming an image are applied, from the viewpoints of stability over time, hardening property and hardening speed. The initiator may be precipitated or separated with time, or performance of the ink after hardening such as strength and abrasion resistance may be deteriorated when the content of the initiator is too large.

The polymerization initiator may be contained in the second liquid B as well as in the first liquid A. The content of the initiator may be appropriately selected in the range for maintaining desired storage stability of the first liquid A.

The polymerization initiator may be contained in the first liquid A without being contained in the second liquid B as described above. The content of the initiator in the first liquid A is preferably in the range of 0.5 to 20% by mass, more preferably 1 to 15% by mass, relative to the polymerizable or crosslinkable compound.

(Sensitization Dye)

A sensitization dye may be added as needed for improvement in sensitivity of the photopolymerization initiator.

Preferable examples of the sensitizing dye include those belonging to the following compound classes and having absorption wavelengths in the range of 350 to 450 nm: multinuclear aromatics (e.g., pyrene, perylene, and triphenylene), xanthenes (e.g., fluorescein, eosin, erythrosine, rhodamine B, and Rose Bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acryflavin), anthraquinones (e.g., anthraquinone), squaliums (e.g., squalium), coumarins (e.g., 7-diethylamino-4-methyl coumarin).

More preferable examples of the sensitizing dye include compounds represented by the following formulae (IX) to (XIII):

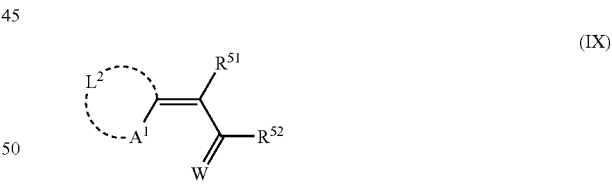

(IX)

(X)

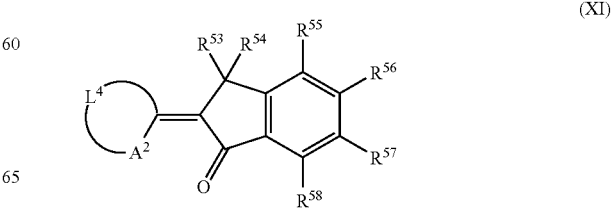

(XI)

-continued

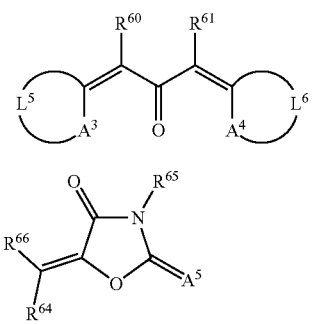
(XII)

(XIII)

In formula (IX), $A^1$ represents a sulfur atom or $NR^{50}$, $R^{50}$ represents an alkyl group or an aryl group, $L^2$ represents a nonmetallic atomic group which, together with $A^1$ and the carbon atom adjacent thereto, forms a basic nucleus of a dye, $R^{51}$ and $R^{52}$ each independently represent a hydrogen atom or a monovalent nonmetallic atomic group, $R^{51}$ and $R^{52}$ may be bound to each other to form an acidic nucleus of a dye, and W represents an oxygen atom or a sulfur atom.

In formula (X), $Ar^1$ and $Ar^2$ each independently represent an aryl group, and are bound to each other via a linkage -$L^3$- which represents —O— or —S—. W has the same definition as in formula (IX).

In formula (XI), $A^2$ represents a sulfur atom or $NR^{59}$, $L^4$ represents a nonmetallic atomic group which, together with $A^2$ and the carbon atom adjacent thereto, forms a basic nucleus of a dye, $R^{53}$, $R^{54}$, $R^{55}$, $R^{56}$, $R^{57}$ and $R^{58}$ each independently represent a monovalent nonmetallic atomic group, and $R^{59}$ represents an alkyl group or an aryl group.

In formula (XII), $A^3$ and $A^4$ each independently represent —S— or —$NR^{62}$ or —$NR^{63}$—. $R^{62}$ and $R^{63}$ each independently represent a substituted or unsubstituted alkyl group or a substituted or unsubstituted aryl group. $L^5$ represent a nonmetallic atomic group which, together with $A^3$ and the carbon atom adjacent thereto, forms a basic nucleus of a dye. $L^6$ represent a nonmetallic atomic group which, together with $A^4$ and the carbon atom adjacent thereto, forms a basic nucleus of a dye. $R^{60}$ and $R^{61}$ each independently represent a hydrogen atom or a monovalent nonmetallic atomic group, or $R^{60}$ and $R^{61}$ are bound to each other to form an aliphatic or aromatic cycle.

In formula (XIII), $R^{66}$ represents an optionally substituted aromatic cycle or heterocycle, $A^5$ represents an oxygen atom, a sulfur atom, or —$NR^{67}$—. $R^{64}$, $R^{65}$, and $R^{67}$ each independently represent a hydrogen atom or a monovalent nonmetallic atomic group. $R^{67}$ and $R^{64}$ may be bonded to each other to form an aliphatic or aromatic ring. $R^{65}$ and $R^{67}$ may be bonded to each other to form an aliphatic or aromatic cycle.

Preferable specific examples of the compounds represented by formulae (IX) to (XIII) include exemplary compounds (A-1) to (A-20) shown below:

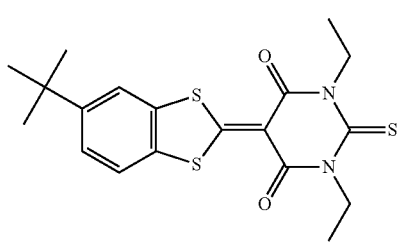
(A-1)

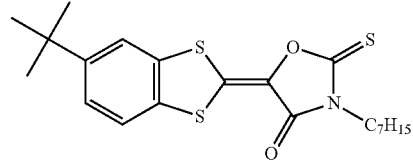
(A-2)

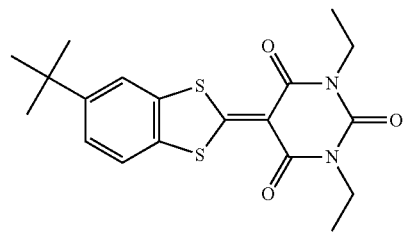
(A-3)

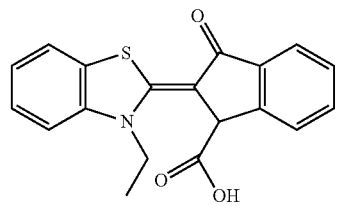
(A-4)

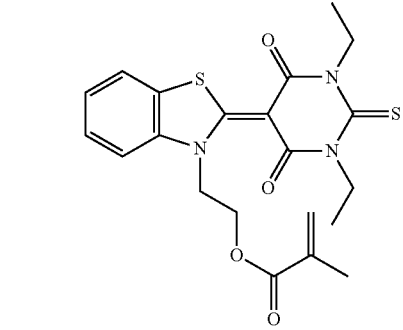
(A-5)

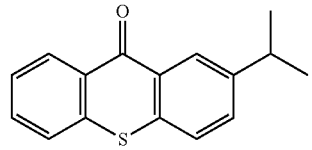
(A-6)

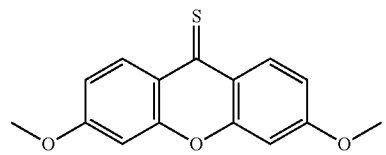
(A-7)

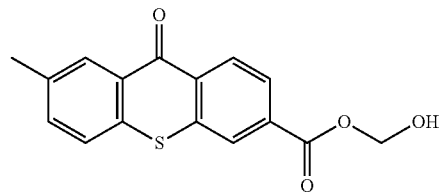
(A-8)

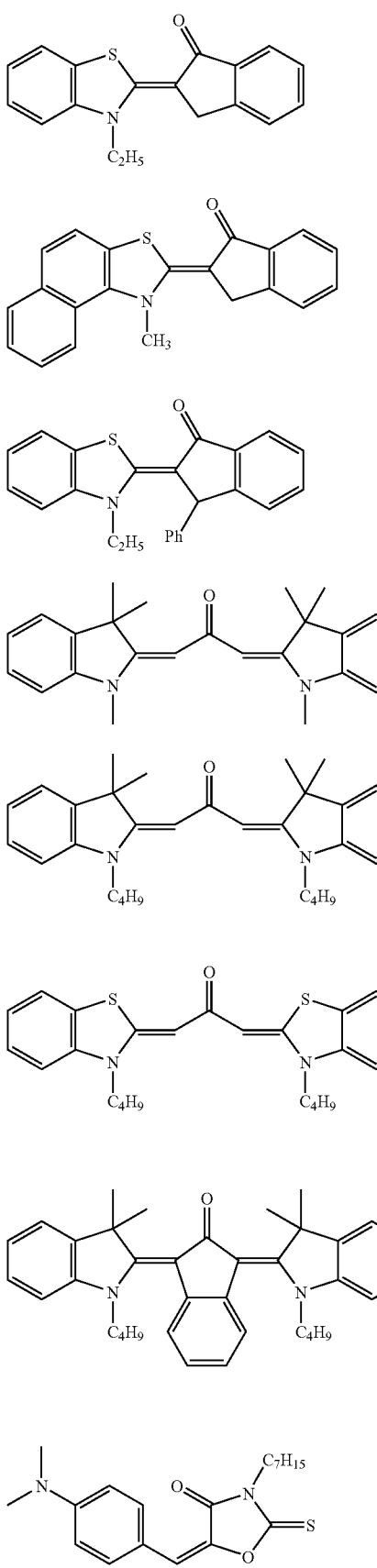

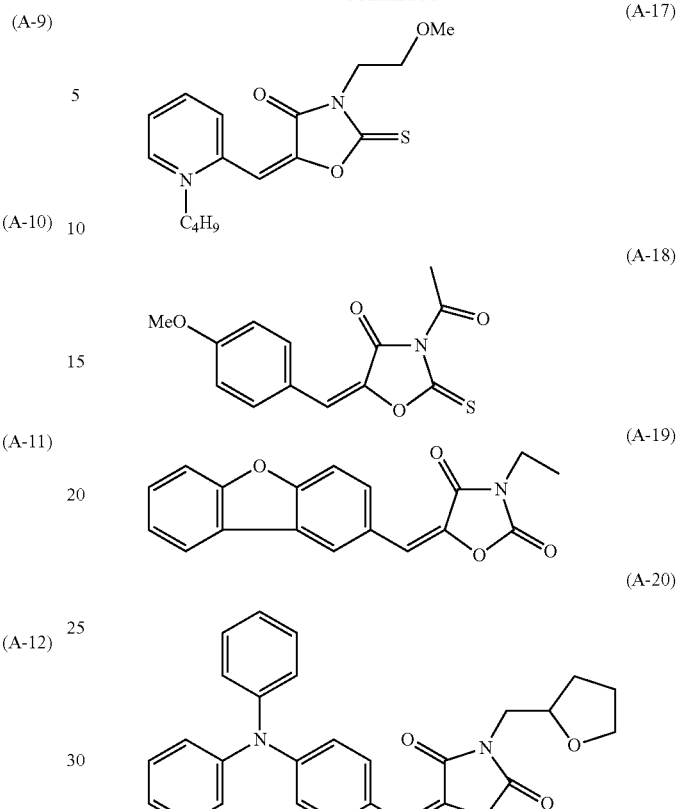

(Cosensitizer)

In addition, a known compound for further improvement in sensitivity or prevention of the polymerization inhibition by oxygen may be added as a cosensitizer.

Examples of the cosensitizer include the amines described, for example, in M. R, Sander et al., "Journal of Polymer Society" 10, p. 3173, (1972), JP-B No. 44-20189, JP-A Nos. 51-82102, 52-134692, 59-138205, 60-84305, 62-18537, and 64-33104 and Research Disclosure 33825 (the disclosures of which are incorporated herein by reference); and specific examples thereof include triethanolamine, ethyl p-dimethylaminobenzoate, p-formyldimethylaniline, and p-methylthiodimethylaniline.

Other examples of the cosensitizer include thiols and sulfides, for example, the thiol compounds described in JP-A No. 53-702, JP-B No. 55-500806, and JP-A No. 5-142772 (the disclosures of which are incorporated herein by reference), and the disulfide compounds described in JP-A No. 56-75643 (the disclosure of which is incorporated herein by reference); and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No. 6-308727 (e.g., trithiane), the phosphorus compounds described in JP-A No. 6-250387 (e.g., diethyl phosphite), and the Si—H and Ge—H compounds described in JP-A No. 8-65779.

—Colorant—

The first liquid A is formulated using at least one pigment as the colorant. The colorant may be contained in the second liquid B or other liquids.

The colorant is not particularly restricted except the pigments, and may be used appropriately selecting from known water-soluble dyes and oil-soluble dyes. Among them, it is preferable that the first liquid A and the second liquid B are formulated as water-insoluble organic solvent systems in terms of the effect of the invention, and oil-soluble dyes readily dissolved or dispersed in the water-insoluble organic solvent are preferably used.

The content of the colorant is in the range of 1 to 30% by mass, more preferably 1.5 to 25% by mass, and particularly 2 to 15% by mass in the first liquid A. The content of the colorant is in the range of 1% by mass or less, more preferably 0.5% by mass, in the second liquid B. However, it is particularly preferable that the second liquid B does not contain any colorant.

The pigment and oil-soluble dye will be described in detail below.

—Pigment—

The first liquid A contains at least one pigment as the colorant. The pigment that is hardly coagulated by mixing a plurality of liquids is preferably used. Any of organic pigments and inorganic pigments may be used. Carbon black is a preferable example of the black pigment. In general, the black pigment and three color pigments of cyan, magenta and yellow are commonly used. Other pigments having other hues such as red, green, blue, brown and white, metal luster pigments such as gold and silver, and colorless or pale-colored extender pigments may be used depending on the object.

Hues of the organic pigment are not restricted, and examples of the pigment include perylene, perynone, quinacridone, quinacridone quinone, anthraquinone, anthanthrone, benzimidazolone, disazo condensed, disazo, indanthrone, phthalocyanine, triaryl carbonium, dioxazine, aminoanthraquinone, diketopyrrolopyrrole, thioindigo, isoindoline, isoindolinone, and pyranthrone or isoviolanthrone-based pigments, or mixtures thereof.

Specifically, examples of the pigment include perylene-based pigments such as C.I. pigment red 190 (C.I. No. 71140), C.I. pigment red 224 (C.I. No. 71127) and C.I. pigment violet 29 (C.I. No. 71129); perynone-based pigments such as C.I. pigment orange 43 (C.I. No. 71105) or C.I. pigment red 194 (C.I. No. 71100); quinacridone-based pigments such as C.I. pigment violet 19 (C.I. No. 73900), C.I. pigment violet 42, C.I. pigment red 122 (C.I. No. 73915), C.I. pigment red 192, C.I. pigment red 202 (C.I. No. 73907), C.I. pigment red 207 (C.I. No. 73900, 73906) or C.I. pigment red 209 (C.I. No. 73905); quinacridone quinone-based pigments such as C.I. pigment red 206 (C.I. No. 73900/73920), C.I. pigment orange 48 (C.I. No. 73900/73920) or C.I. pigment orange 49 (C.I. No. 73900/73920); anthraquinone-based pigments such as C.I. pigment yellow 147 (C.I. No. 60645); anthanthrone-based pigments such as C.I. pigment red 168 (C.I. No. 59300); benzimidazolone-based pigments such as C.I. pigment brown 25 (C.I. No. 12510), C.I. pigment violet 32 (C.I. No. 12517), C.I. pigment yellow 180 (C.I. No. 21290), C.I. pigment yellow 181 (C.I. No. 11777), C.I. pigment orange 62 (C.I. No. 11775) or C.I. pigment red 185 (C.I. No. 12516), disazo-condensed pigments such as C.I. pigment yellow 93 (C.I. No. 20710), C.I. pigment yellow 94 (C.I. No. 20038), C.I. pigment yellow 95 (C.I. No. 20034), C.I. pigment yellow 128 (C.I. No. 20037), C.I. pigment yellow 166 (C.I. No. 20035), C.I. pigment orange 34 (C.I. No. 21115), C.I. pigment orange 13 (C.I. No. 21110), C.I. pigment orange 31 (C.I. No. 20050), C.I. pigment red 144 (C.I. No. 20735), C.I. pigment red 166 (C.I. No. 20730), C.I. pigment red 220 (C.I. No. 20055), C.I. pigment red 221 (C.I. No. 20065), C.I. pigment red 242 (C.I. No. 20067), C.I. pigment red 248, C.I. pigment red 262 or C.I. pigment brown 23 (C.I. No. 20060);

disazo-based pigments such as C.I. pigment yellow 13 (C.I. No. 21100), C.I. pigment yellow 83 (C.I. No. 21108) or C.I. pigment yellow 188 (C.I. No. 21094); azo-based pigment such as C.I. pigment red 187 (C.I. No. 12486), C.I. pigment red 170 (C.I. No. 12475), C.I. pigment yellow 74 (C.I. No. 11714), C.I. pigment yellow 150 (C.I. No. 48545), C.I. pigment red 48 (C.I. No. 15865), C.I. pigment red 53 (C.I. No. 15585), C.I. pigment orange 64 (C.I. No. 12760) or C.I. pigment red 247 (C.I. No. 15915); indanthrone-based pigments such as C.I. pigment Blue 60 (C.I. No. 69800); phthalocyanine-based pigments such as C.I. pigment green 7 (C.I. NO. 74260), C.I. pigment green 36 (C.I. No. 74265), pigment green 37 (C.I. No. 74255), pigment blue 16 (C.I. No. 74100), C.I. pigment blue 75 (C.I. No. 74160:2) or 15 (C.I. No. 74160); triarylcarbonium-based pigments such as C.I. pigment blue 56 (C.I. No. 42800), C.I. pigment blue 61 (C.I. No. 42765:1); dioxazine-based pigments such as C.I. pigment violet 23 (C.I. No. 51319) or C.I. pigment violet 37 (C.I. No. 51345); aminoanthraquinone-based pigments such as C.I. pigment red 177 (C.I. No. 65300); diketopyrrolopyrrole-based pigments such as C.I. pigment red 254 (C.I. No. 56110), C.I. pigment red 255 (C.I. No. 561050), C.I. pigment red 264, C.I. pigment red 272 (C.I. No. 561150), C.I. pigment orange 71 or C.I. pigment orange 73; thioindigo-based pigments such as C.I. pigment red 88 (C.I. No. 73312); isoindoline-based pigments such as C.I. pigment yellow 139 (C.I. No. 56298) or C.I. pigment orange 66 (C.I. No. 48210); isoindolinone-based pigments such as C.I. pigment yellow 109 (C.I. No. 56284) or C.I. pigment orange 61 (C.I. No. 11295); pyranthrone-based pigments such as C.I. pigment orange 40 (C.I. No. 59700) or C.I. pigment red 216 (C.I. No. 59710); or isoviolanthrone-based pigments such as C.I. pigment violet 32 (C.I. No. 60010).

Plural organic pigments or solid solutions of the organic pigments may be combined for use in the invention.

Particles prepared by adhering a dye or a pigment on the surface of particles such as silica, alumina or resins as core materials, insoluble lake of a dye, colored emulsion or colored latex may be used as the pigment. Pigments coated with a resin may be also used. Such pigments are referred to a micro-capsulated pigment, and are commercially available from Dainippon Ink and Chemicals, Inc. and Toyo Ink MFG Co., Ltd.

The volume average particle diameter of the pigment particles in the liquid is preferably in the range of 10 to 250 nm, more preferably 50 to 200 nm, from the viewpoint of optical density and storage stability. The volume average particle diameter of the pigment particles can be measured with a measuring apparatus such as LB-500 (trade name: manufactured by Horiba Ltd.).

—Oil-soluble Dye—

The oil-soluble dye is not particularly restricted, and any dyes may be selected for use. Examples of the oil-soluble dye are shown below by dividing into the hues.

Example of the yellow dye include aryl or heteryl azo dyes having phenols, naphthols, anilines, pyrazolones, pyridones or open-chain active methylene compounds as coupling components; azomethine dyes having open-chain active methylene compounds as coupling components; methine dyes such as benzylidene dyes and monomethine oxonol dyes; and quinone-based dyes such as naphthoquinone dyes and anthraquinone dyes. Other examples of the dye include quinophthalone dyes, nitro-nitroso dyes, acridine dyes and acridinone dyes.

Examples of magenta dyes include aryl or heteryl azo dyes having phenols, naphthols or anilines as coupling components; azomethine dyes having pyrazolones or pyrazorotriazoles as coupling components; methine dyes such as arylidene dyes, styryl dyes, merocyanine dyes and oxonol dyes; carbonium dyes such as diphenylmethane dyes, triphenylmethane dyes or xanthene dues; quinone-based dyes such as naphthoquinone, anthraquinone and anthrapyridone; and condensed polycyclic dyes such as dioxazine-based dyes.

Examples of cyan dyes include indoaniline dyes, indophenol dyes or azomethine dyes having pyrrolotriazoles as coupling components; polymethine dyes such as cyanine dyes, oxonol dyes or merocyanine dyes; carbonium dyes such as diphenylmethane dyes and triphenylmethane dyes; xanthene dyes; phthalocyanine dyes; anthraquinone dyes; aryl or heteryl dyes having phenols, naphthols or anilines as coupling components; and indigo-thioindigo dyes.

The dyes may only develop respective colors of yellow, magenta and cyan by dissociating a part of their chromophores. Counter cations may be inorganic cations such as alkali metals or ammonium, organic cations such as pyridinium or quaternary ammonium salts, or polymer cations having at least one of the inorganic cation and organic cation as the partial structure.

One of the colorants may be used alone, or two or more kinds of colorants may be mixed for use. The colorants may be different for every application of droplets and liquids, or the same colorant may be used.

While the polymer having a heterocyclic residue for forming the colorant is contained in the first liquid A in the invention, the second liquid B may contain the polymer having a heterocyclic residue for forming the colorant. The second liquid B is preferably prepared so as to have a sp value of 35 or less. The second liquid B is preferably insoluble in water, and is prepared so as to have a property compatible with an oil-soluble organic solvent.

Affinity with the first liquid A (droplet a1, droplet a2 and so on) containing the polymerizable or crosslinkable compound increases when the sp value of second liquid is 35 or less, and droplets are suppressed from being fused to each other when first droplet a1 and second droplet a2 are applied so as to overlap to each other. Consequently, blurring of the image and irregularity of the line width of thin lines can be effectively prevented from occurring.

Droplet a1, droplet a2 and so on of the first liquid A may be favorably prepared in an organic solvent system containing the polymerizable or crosslinkable compound. The first liquid A can be readily mixed with the second liquid B when the former is prepared in an organic solvent system, and fusion of droplets such as fusion between first droplet a1 and second droplet a2 applied so that they have overlap portions by being in contact to each other may be efficiently avoided. Consequently, blurring of the image and irregularity of the line width of thin lines can be effectively prevented from occurring.

The sp value of the second liquid B can be favorably adjusted using a lipophilic solvent (high boiling point organic solvent, polymerizable compound). The sp value can be favorably adjusted by formulating the liquid so that the proportion of the lipophilic solvent is in the range of 50% by mass or more to 100% by mass or less of the total amount of the second liquid B. The sp value may be reduced into the range of 35 or less when the content of the lipophilic solvent is in the above-mentioned range.

The range of the sp value of the second liquid B is preferably 30 or less, particularly preferably 25 or less.

The sp value is defined for various solvents and solutes, and shows solubility between the solvents and between the solvent and solute. In case, the solvent and the solute is blended, the value is calculated from energy changes when the solute is dissolved in the solvent, and can be specifically obtained by calculation using a sp value calculating program by R. L. Smith (Tohoku University). In the calculation, constituting units of polymers and polyethylene chains are defined as saturated repeating units having chemical bonds (for example, —$CH_2$—$CH(C_6H_5)$— for styrene) except compounds having no carbon atoms at a reference temperature of 25° C., and the sp value is calculated based on 47.8 of water ($H_2O$).

—Lipophilic Solvent—

The lipophilic solvent is effective for preventing blurring of the image and irregular line width of thin lines from occurring, and the solvent is able to adjust the sp value of the second liquid B in the above-mentioned range.

The term "lipophilic solvent" refers to a compound having a solubility of 1 g or less in 100 ml of water.

The lipophilic solvent may be contained in the first liquid A with or without being contained in the second liquid B. Alternatively, the lipophilic solvent may be contained in a solvent other than the second liquid B and the first liquid A.

Examples of the lipophilic solvent include high boiling point organic solvents and above-described polymerizable compounds (polymerizable or crosslinkable compound). The high boiling point organic solvent is preferably used in terms of preventing the nozzle from being clogged, and polymerizable compounds selected from the above-mentioned polymerizable or crosslinkable compounds are preferably used in terms of strengthening the film formed with the ink.

The high boiling point organic solvent suitable in the invention will be described below.

The high boiling point organic solvent is preferably a solvent having (1) a viscosity of 100 mPa·s or less at 25° C., or a viscosity of 30 mPa·s or less at 60° C., and (2) a boiling point of higher than 100° C.

A high boiling point organic solvent not satisfying any one of the conditions of (1) has an increased viscosity, making ejection of the ink on recording medium difficult, and a high boiling point organic solvent not satisfying the condition in boiling point (2) has an excessively lower boiling point, leading to vaporization during image recording and consequently to decrease of the advantageous effects of the invention.

For the conditions as described in above (1), the viscosity at 25° C. is preferably in the range of 70 mPa·s or lower, more preferably, in the range of 40 mPa·s or lower, and most preferably in the range of 20 mPa·s or lower. The viscosity at 60° C. is preferably in the range of 20 mPa·s or lower, and most preferably in the range of 10 mPa·s or lower. For the conditions as described in above (2), the boiling point is more preferably in the range of 150° C. or higher, and most preferably in the range of 170° C. or higher. The lower limit of the melting point is preferably in the range of 80° C. or lower. Furthermore, the solubility of water (25° C.) is preferably 4 g or less, more preferably in the range of 3 g or less, further preferably in the range of 2 g or less, and most preferably in the range of 1 g or less.

The above-described "viscosity" has been determined using a RE80 type viscometer (manufactured by Toki Sangyo Co., Ltd.). The RE80 type viscometer is a conical-frustum type viscometer corresponding to an E type. The viscosity was measured at a rotational speed of 10 r.p.m. using a rotor of rotor code No. 1. The rotational speed was as necessary changed to 5 r.p.m., 2.5 r.p.m., 1 r.p.m., 0.5 r. p.m., or others for measuring solvents having a viscosity higher than 60 mPa·s.

"Solubility of water" refers to the saturation density of water in a high boiling point organic solvent at 25° C., and means the mass (g) of water soluble in 100 g of the high boiling point organic solvent at 25° C.

As the above-described high boiling point organic solvent, the compounds represented by the following formulae [S-1] to [S-9] are preferable.

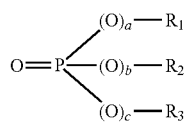

Formula [S-1]

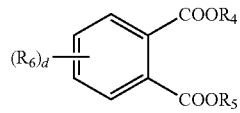

Formula [S-2]

Formula [S-3]

Formula [S-4]

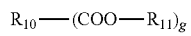

Formula [S-5]

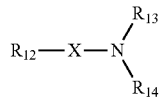

Formula [S-6]

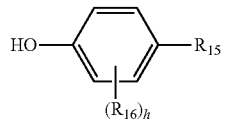

Formula [S-7]

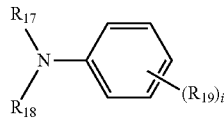

Formula [S-8]

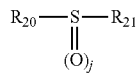

Formula [S-9]

In the above-described formula [S-1], $R_1$, $R_2$ and $R_3$ each independently represent an aliphatic group or an aryl group. a, b, and c each independently represent 0 or 1.

In the formula [S-2], $R_4$ and $R_5$ each independently represent an aliphatic group or an aryl group, $R_6$ represents a halogen atom (F, Cl, Br, I, hereinafter the same), an alkyl group, an alkoxy group, an aryloxy group, an alkoxycarbonyl group, or an aryloxycarbonyl group, and d represents an integral number of 0 to 3. When d is two or more, a plurality of $R_6$s may be the same or different from each other.

In the formula [S-3], Ar represents an aryl group, e represents an integral number of 1 to 6, and $R_7$ represents a hydrocarbon group having a valence of e or hydrocarbon groups linked each other by an ether bond.

In the formula [S-4], $R_8$ represents an aliphatic group, f represents an integral number of 1 to 6, and $R_9$ represents a hydrocarbon group having a valence of f or hydrocarbon groups linked each other by an ether bond.

In the formula [S-5], g represents an integral number of 2 to 6, $R_{10}$ represents a hydrocarbon group having a valence of g (excluding an aryl group), and $R_{11}$ represents an aliphatic group or an aryl group.

In the formula [S-6], $R_{12}$, $R_{13}$ and $R_{14}$ each independently represent hydrogen atom, an aliphatic group, or an aryl group. X represents —CO— or —SO$_2$—. $R_{12}$ and $R_{13}$ or $R_{13}$ and $R_{14}$ may be linked each other to form a ring.

In the formula [S-7], $R_{15}$ represents an aliphatic group, an alkoxycarbonyl group, an aryloxycarbonyl group, an alkylsulfonyl group, an arylsulfonyl group, an aryl group or a cyano group, $R_{16}$ represents a halogen atom, an aliphatic group, an aryl group, an alkoxy group or an aryloxy group, h represents an integral number of 0 to 3. When h is two or more, a plurality of $R_{16}$s may be the same or different.

In the formula [S-8], $R_{17}$ and $R_{18}$ each independently represent an aliphatic group or an aryl group, $R_{19}$ represents a halogen atom, an aliphatic group, an aryl group, an alkoxy group, or an aryloxy group, i represents an integral number of 0 to 5. When i is two or more, a plurality of $R_{19}$s may be the same or different from each other.

In the formula [S-9], $R_{20}$ and $R_{21}$ each independently represent an aliphatic group or an aryl group. j represents 1 or 2. $R_{20}$ and $R_{21}$ may be linked each other to form a ring.

In the formulae [S-1] to [S-9], when $R_1$ to $R_6$, $R_8$, $R_{11}$ to $R_{21}$ are group containing an aliphatic group or an aliphatic group, the aliphatic group may be straight-chain, branched-chain, or cyclic, and may contain unsaturated bonds or have substituents. Examples of the substituent include a halogen atom, an aryl group, an alkoxy group, an aryloxy group, an alkoxycarbonyl group, a hydroxy group, an acyloxy group, and an epoxy group.

In the formulae [S-1] to [S-9], when $R_1$ to $R_6$, $R_8$, $R_{11}$ to $R_{21}$ are cyclic aliphatic groups, namely cycloalkyl groups or groups containing a cycloalkyl group, the cycloalkyl group may contain unsaturated bonds within a 3- to 8-membered ring, and may have substituents or crosslinking groups. Examples of the substituent include a halogen atom, an aliphatic group, a hydroxy group, an acyl group, an aryl group, an alkoxy group, and an epoxy group, and examples of the crosslinking group include methylene, ethylene, and isopropylidene.

In the formulae [S-1] to [S-9], when $R_1$ to $R_6$, $R_8$, $R_{11}$ to $R_{21}$ Ar, are aryl groups or groups containing an aryl group, the aryl group may be substituted with a substituent such as a halogen atom, an aliphatic group, an aryl group, an alkoxy group, an aryloxy group, and alkoxycarbonyl group.

In the formulae [S-3], [S-4], and [S-5], when $R_7$, $R_9$ or $R_{10}$ is a hydrocarbon group, the hydrocarbon group may contain a cyclic structure (e.g., a benzene ring, a cyclopentane ring, a cyclohexane ring) or an unsaturated bond, and may have substituents. Examples of the substituent include a halogen atom, a hydroxy group, an acyloxy group, an aryl group, an alkoxy group, an aryloxy group, and epoxy group.

Among the high boiling point organic solvents represented by the formulae [S-1] to [S-9], the most preferable high boiling point organic solvents are further described below.

In the formula [S-1], $R_1$, $R_2$, and $R_3$ are each independently preferably an aliphatic group having 1 to 24 (preferably 4 to 18) carbon atoms (e.g., n-butyl, n-hexyl, n-octyl, EH-octyl, 2-ethylhexyl, 3,3,5-trimethylhexyl, 3,5,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, and 4-methylcyclohexyl), or an aryl group having 6 to 24 (preferably 6 to 18) carbon atoms (e.g., phenyl, cresyl, p-nonyl phenyl, xylyl, cumenyl, p-methoxyphenyl, and p-methoxycarbonylphenyl). Among them, $R_1$, $R_2$, and $R_3$ are most preferably n-hexyl, n-octyl, EH-octyl, 2-ethylhexyl, 3,5,5-trimethylhexyl, n-dodecyl, 2-chloroethyl, 2-butoxyethyl, cyclohexyl, phenyl, cresyl, p-nonyl phenyl, or cumenyl.

Each of a, b, and c represents 0 or 1, and more preferably all of a, b, and c are 1.

In the formula [S-2], $R_4$ and $R_5$ are each independently preferably an aliphatic group having 1 to 24 (preferably 4 to 18) carbon atoms (e.g., the aliphatic groups as listed for the above-described $R_1$, heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, 1-methylcyclohexyl), or an aryl group having 6 to 24 (preferably 6 to 18) carbon atoms (e.g., the aryl groups as listed for the above-described $R_1$, 4-t-butylphenyl, 4-t-octylphenyl, 1,3,5-trimethylphenyl, 2,4-di-t-butylphenyl, and 2,4,-di-t-pentyl phenyl). Among them, $R_4$ and $R_5$ are more preferably an aliphatic group, and most preferably n-butyl, heptyl, 2-ethylhexyl, n-dodecyl, 2-butoxyethyl, or ethoxycarbonylmethyl.

$R_6$ is preferably a halogen atom (preferably, a chlorine atom), an alkyl group having 1 to 18 carbon atoms (e.g., methyl, isopropyl, t-butyl, and n-dodecyl), an alkoxy group having 1 to 18 carbon atoms (e.g., methoxy, n-butoxy, n-octyloxy, methoxyethoxy, and benzyloxy), an aryloxy group having 6 to 18 carbon atoms (e.g., phenoxy, p-tolyloxy, 4-methoxyphenoxy, and 4-t-butylphenoxy), an alkoxycarbonyl group having 2 to 19 carbon atoms (e.g., methoxycarbonyl, n-butoxycarbonyl, 2-ethylhexyloxycarbonyl), or an aryloxycarbonyl group having 6 to 25 carbon atoms. Among them, $R_6$ is more preferably an alkoxycarbonyl group, and most preferably n-butoxycarbonyl.

d is 0 or 1.

In the formula [S-3], Ar is preferably an aryl group having 6 to 24 (preferably 6 to 18) carbon atoms (e.g., phenyl, 4-chlorophenyl, 2,4-dichlorophenyl, 4-methoxyphenyl, 1-naphthyl, 4-n-butoxyphenyl, 1,3,5-trimethylphenyl, and 2-(2-n-butoxycarbonylphenyl)phenyl). Among them, Ar is more preferably phenyl, 2,4-dichlorophenyl, or 2-(2-n-butoxy carbonyl phenyl)phenyl.

e is an integral number of 1 to 4 (preferably 1 to 3).

$R_7$ is preferably a hydrocarbon group having a valence of e and having 2 to 24 (preferably 2 to 18) carbon atoms [e.g., the aliphatic groups as listed for the above-described $R_4$, n-octyl, the aryl groups as listed for the above-described $R_4$, —(CH$_2$)$_2$—, the following groups,

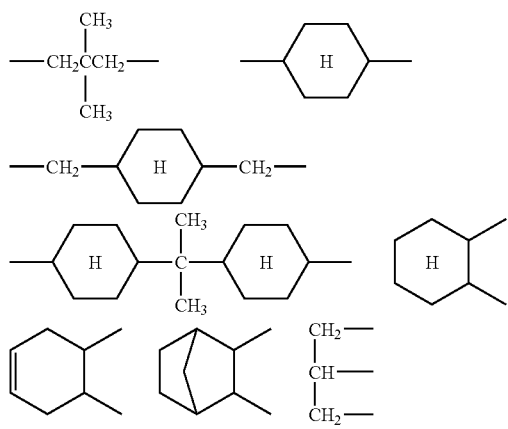

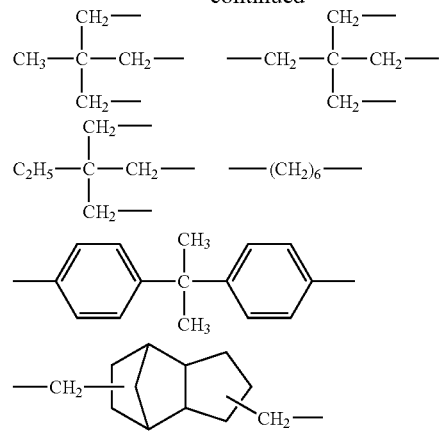

or hydrocarbon groups having a valence of e and having 4 to 24 (preferably 4 to 18) carbon atoms which are linked each other by an ether bond [e.g., —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$— or the following groups].

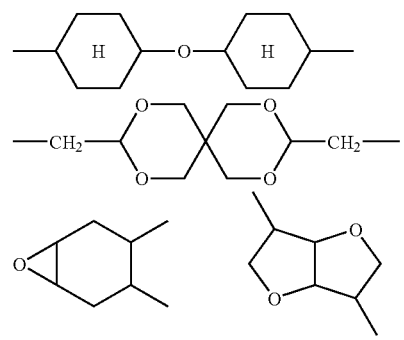

Among them, $R_7$ is more preferably an alkyl group, and most preferably n-butyl, n-octyl, or 2-ethylhexyl.

In the formula [S-4], $R_8$ is preferably an aliphatic group having 1 to 24 (preferably 1 to 17) carbon atoms (e.g., methyl, n-propyl, 1-hydroxyethyl, 1-ethylpentyl, n-heptyl, n-undecyl, n-tridecyl, pentadecyl, 8,9-epoxy heptadecyl, cyclopropyl, cyclohexyl, and 4-methylcyclohexyl). Among them, $R_8$ is most preferably n-heptyl, n-tridecyl, 1-hydroxy ethyl, 1-ethylpentyl, or 8,9-epoxyheptadecyl.

f is an integral number of 1 to 4 (preferably 1 to 3).

$R_9$ is preferably a hydrocarbon group having a valence of f and having 2 to 24 (preferably 2 to 18) carbon atoms, or hydrocarbon groups having a valence of f and 4 to 24 (preferably 4 to 18) carbon atoms which are linked each other by an ether bond (e.g., the groups as listed for the above-described $R_7$, 1-methyl-2-methoxyethyl, and 2-hexyldecyl). Among them, $R_9$ is most preferably 2-ethylhexyl, 2-hexyldecyl, or 1-methyl-2-methoxyethyl or the following groups.

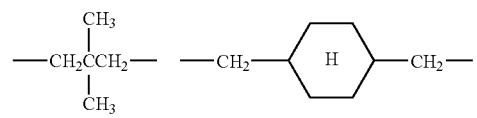

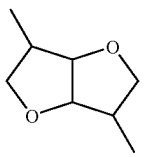

In the formula [S-5], g is 2 to 4 (preferably 2 or 3).

$R_{10}$ is preferably a hydrocarbon group having a valence of g [for example, $-CH_2-$, $-(CH_2)_2-$, $-(CH_2)_4-$, $-(CH_2)_7-$, or $-(CH_2)_8-$ or the following groups].

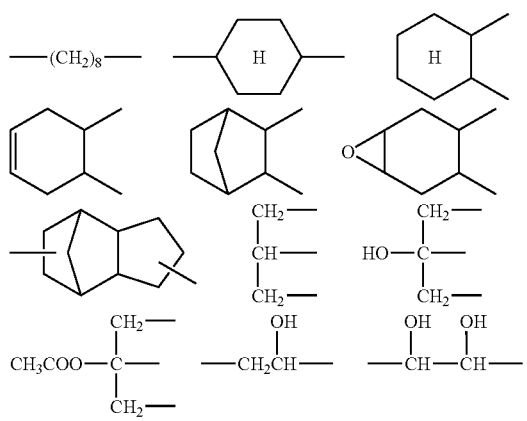

Among them, $R_{10}$ is most preferably, $-(CH_2)_4-$ or $-(CH_2)_8-$ or the following groups.

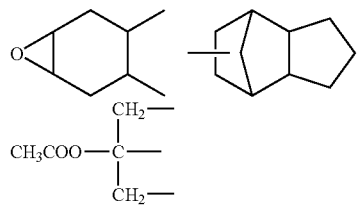

$R_{11}$ is preferably an aliphatic group having 1 to 24 (preferably 4 to 18) carbon atoms, or aryl group having 6 to 24 (preferably 6 to 18) carbon atoms (e.g., the aliphatic groups and aryl groups as listed for the above-described $R_4$). Among them, $R_{11}$ is more preferably an alkyl group, and most preferably n-butyl, n-octyl, or 2-ethylhexyl.

In the formula [S-6], $R_{12}$ is preferably hydrogen atom, an aliphatic group having 1 to 24 (preferably 3 to 20) carbon atoms [e.g., n-propyl, 1-ethyl pentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, 4-methylcyclohexyl, and 8-N,N-diethylcarbamoyloctyl], or an aryl group having 6 to 24 (preferably 6 to 18) carbon atoms (e.g., the aryl group as listed for the above-described Ar, 3-methylphenyl, and 2-(N,N-di-n-octylcarbamoyl)phenyl). Among them, $R_{12}$ is most preferably n-undecyl, 8-N,N-diethylcarbamoyloctyl, 3-methylphenyl, or 2-(N,N-di-n-octylcarbamoyl)phenyl.

$R_{13}$ and $R_{14}$ are each preferably hydrogen atom, an aliphatic group having 1 to 24 (preferably 1 to 18) carbon atoms (e.g., methyl, ethyl, isopropyl, n-butyl, n-hexyl, n-octyl, 2-ethylhexyl, n-dodecyl, n-tetradecyl, cyclopentyl, and cyclopropyl), or an aryl group having 6 to 18 (preferably 6 to 15) carbon atoms (e.g., phenyl, 1-naphthyl, and p-tolyl). Among them, $R_{13}$ and $R_{14}$ are each most preferably methyl, ethyl, n-butyl, n-octyl, n-tetradecyl, or phenyl. $R_{13}$ and $R_{14}$ may be linked each other to form a pyrrolidine ring, a piperidine ring, or a morpholine ring together with N. $R_{12}$ and $R_{13}$ may be linked each other to form a pyrrolidone ring or a piperidine ring together with N.

X is $-CO-$ or $-SO_2-$, and preferably X is $-CO-$.

In the formula [S-7], $R_{15}$ is preferably an aliphatic group having 1 to 24 (preferably 3 to 18) carbon atoms (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, and cyclohexyl), an alkoxycarbonyl group having 2 to 24 (preferably 5 to 17) carbon atoms (e.g., n-butoxycarbonyl, 2-ethylhexyloxycarbonyl, and n-dodecyloxycarbonyl), an aryloxycarbonyl group having 7 to 24 (preferably 7 to 18) carbon atoms (e.g., phenoxycarbonyl group, naphthoxycarbonyl group, and cresyloxycarbonyl group), an alkylsulfonyl group having 1 to 24 (preferably 1 to 18) carbon atoms (e.g., methylsulfonyl, n-butylsulfonyl, and n-dodecylsulfonyl), an arylsulfonyl group having 6 to 30 (preferably 6 to 24) carbon atoms (e.g., p-tolylsulfonyl, p-dodecylphenylsulfonyl, and p-hexadecyloxyphenylsulfonyl), an aryl group having 6 to 32 (preferably 6 to 24) carbon atoms (e.g., phenyl and p-tolyl), or a cyano group. Among them, $R_{15}$ is more preferably an aliphatic group having 1 to 24 carbon atoms or an alkoxycarbonyl group having 2 to 24 carbon atoms, and most preferably an aliphatic group having 1 to 24 carbon atoms.

$R_{16}$ is preferably a halogen atom (preferably Cl), an aliphatic group having 1 to 24 (preferably 1 to 18) carbon atoms {more preferably, an alkyl group (e.g., the alkyl group as listed for the above-described $R_{15}$), a cycloalkyl group having 3 to 18 (more preferably 5 to 17) carbon atoms (e.g., cyclopentyl and cyclohexyl)}, an aryl group having 6 to 32 (preferably 6 to 24) carbon atoms (e.g., phenyl and p-tolyl), an alkoxy group having 1 to 24 (preferably 1 to 18) carbon atoms (e.g., methoxy, n-butoxy, 2-ethylhexyloxy, benzyloxy, n-dodecyloxy, n-hexadecyloxy), or an aryloxy group having 6 to 32 (preferably 6 to 24) carbon atoms (e.g., phenoxy, p-t-butylphenoxy, p-t-octylphenoxy, m-pentadecylphenoxy, and p-dodecyloxyphenoxy). Among them, $R_{16}$ is more preferably an aliphatic group having 1 to 24 carbon atoms, and most preferably an aliphatic group having 1 to 12 carbon atoms.

h is an integral number of 1 to 2.

In the formula [S-8], preferable examples of $R_{17}$ and $R_{18}$ are the same as those listed for the above-described $R_{13}$ and $R_{14}$ except for hydrogen atom. Among them, $R_{17}$ and $R_{18}$ are each more preferably an aliphatic group, and most preferably n-butyl, n-octyl, or n-dodecyl. $R_{17}$ and $R_{18}$ cannot be linked each other to form a ring.

Preferable examples of $R_{19}$ are the same as those listed for the above-described $R_{16}$. Among them, $R_{19}$ is more preferably an alkyl group or an alkoxy group, and most preferably n-octyl, methoxy, n-butoxy, or n-octyloxy.

i is an integral number of 1 to 5.

In the formula [S-9], preferable examples of $R_{20}$ and $R_{21}$ are the same as those listed for the above-described $R_1$, $R_2$, and $R_3$ when they do not form a ring. Among them, $R_{20}$ and $R_{21}$ are most preferably a substituted or nonsubstituted aliphatic group having 1 to 24 carbon atoms. $R_{20}$ and $R_{21}$ may be linked each other to form a ring, and the formed ring has preferably 3 to 10 members, and most preferably 5 to 7 members.

j represents 1 or 2, and preferably j is 1.

Specific examples of the high boiling point organic solvent (compounds S-1 to S-53), and the viscosity (measured at temperatures of 25° C. and 60° C. using the above-described means; mpa·s) and boiling point (° C.) of the high boiling point organic solvents are summarized below.

The boiling point of the high boiling point organic solvents has been calculated by converting from the boiling point during distillation under reduced pressure to that under normal pressure. In the following specific examples, the compounds whose boiling point is not shown have been confirmed not to boil at 170° C., and the compounds whose viscosity at 25° C. is not shown are solid at 25° C.

| | | Viscosity (mPa·s) | | Boiling point (° C.) |
|---|---|---|---|---|
| | | (25° C.) | (60° C.) | |
| Compound represented by Formula[S-1] | | | | |
| S-1 | 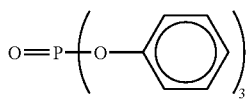 | — | 8.3 | 370 |
| S-2 | 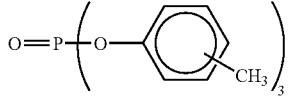 | 57.6 | 11.8 | 435 |
| S-3 | 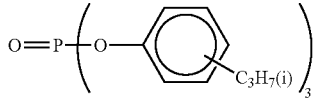 | 95 | 17.5 | 485 |
| S-4 | 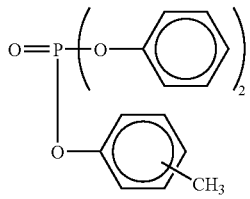 | 65 | 12.8 | 435 |
| S-5 | 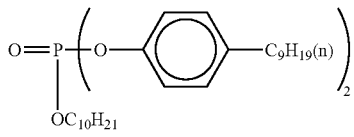 | 49 | 10.3 | 435 |
| S-6 | 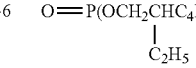 | 11.7 | 4.0 | 390 |
| S-7 | 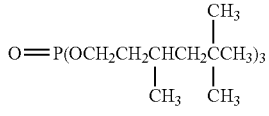 | 20.22 | 5.8 | 420 |
| S-8 | O=P(OC$_{12}$H$_{25}$(n))$_3$ | 28.6 | 6.9 | 480 |
| S-9 | O=P(OC$_6$H$_{13}$(n))$_3$ | 6.62 | 3.0 | 365 |
| S-10 | O=P(OCH$_2$CH$_2$Cl)$_3$ | 20.8 | 5.5 | 360 |
| S-11 | O=P(OCH$_2$CH$_2$OC$_4$H$_9$(n))$_3$ | 10.9 | 3.8 | 400 |
| S-12 | ((EH)C$_8$H$_{17}$)$_3$P=O | 41.1 | 9.0 | — |
| S-13 | 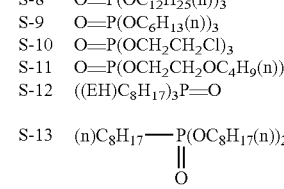 | 13.7 | 4.3 | — |
| Compound represented by Formula[S-2] | | | | |
| S-14 | 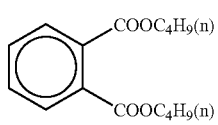 | 20.3 | 5.1 | 370 |

-continued
| | | | | |
|---|---|---|---|---|
| S-15 | 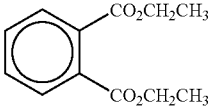 | 10.1 | 3.7 | 296 |
| S-16 | 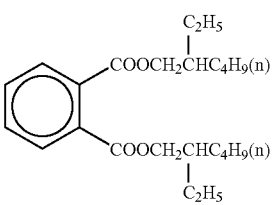 | 62.7 | 11.7 | 400 |
| S-17 | 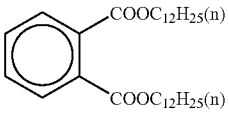 | 52.1 | 10.8 | — |
| S-18 | 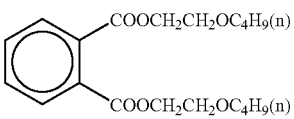 | 42 | 9.1 | 335 |
| S-19 | 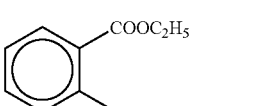 | 74 | 14.2 | 355 |
| S-20 | 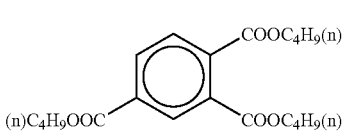 | 55.7 | 13.1 | 400 |
Compound represented by Formula[S-3]
| | | | | |
|---|---|---|---|---|
| S-21 | 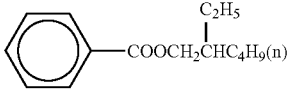 | 5.68 | 2.4 | 300 |
| S-22 | 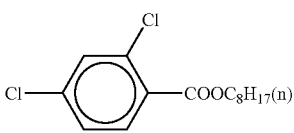 | 11.44 | 3.9 | 360 |
| S-23 | 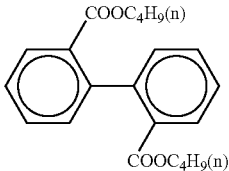 | 51.1 | 10.6 | — |
Compound represented by Formula[S-4]
| | | | | |
|---|---|---|---|---|
| S-24 |  | 7.17 | 3.1 | 380 |
| S-25 | 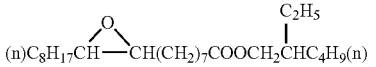 | 39.84 | 8.8 | — |

-continued

| | | | | |
|---|---|---|---|---|
| S-26 | CH₃CH(OH)COOCH₂CH(C₆H₁₃(n))C₈H₁₇(n) | 22.83 | 5.9 | — |
| S-27 | (n)C₄H₉CH(C₂H₅)COOCH₂C(CH₃)(CH₃)CH₂OCOC(C₂H₅)HC₄H₉(n) | 12 | 4.0 | — |
| S-28 | (n)C₄H₉CH(C₂H₅)COOCH₂—[cyclohexyl-H]—CH₂OCOCH(C₂H₅)C₄H₉(n) | 41.4 | 9.0 | 430 |
| S-29 | 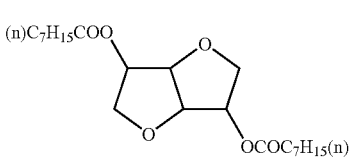 | 47.3 | 10.0 | 440 |

Compound represented by Formula[S-5]

| | | | | |
|---|---|---|---|---|
| S-30 | (n)C₄H₉CH(C₂H₅)CH₂OCO(CH₂)₄COOCH₂CH(C₂H₅)C₄H₉(n) | 11.7 | 4.3 | 390 |
| S-31 | (n)C₄H₉CH(C₂H₅)CH₂OCO(CH₂)₈COOCH₂CH(C₂H₅)C₄H₉(n) | 19.9 | 6.1 | 410 |
| S-32 | (n)C₄H₉OCO(CH₂)₈COOC₄H₉(n) | 8.09 | 3.5 | 345 |
| S-33 | 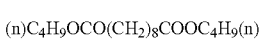 | 88.9 | 16.5 | — |
| S-34 | 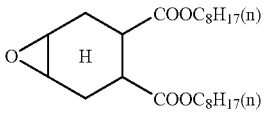 | 37.50 | 8.4 | 440 |
| S-35 | CH₃COO—C(CH₂COOC₄H₉(n))(CH₂COOC₄H₉(n))—COOC₄H₉(n) | 42.7 | 9.3 | 390 |

Compound represented by Formula[S-6]

| | | | | |
|---|---|---|---|---|
| S-36 | (n)C₁₁H₂₃CON(C₄H₉(n))(C₄H₉(n)) | 9.45 | 3.6 | 340 |
| S-37 | 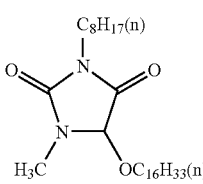 | 45.8 | 9.8 | — |

-continued

| | | | | |
|---|---|---|---|---|
| S-38 | 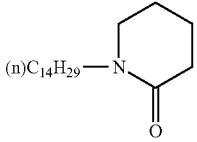 (n)C$_{14}$H$_{29}$—N piperidinone | 20.0 | 5.4 | 350 |
| S-39 | 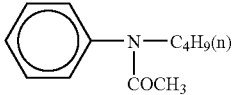 phenyl-N(C$_4$H$_9$(n))(COCH$_3$) | 12.83 | 4.2 | 320 |
| S-40 | ((n)C$_8$H$_{17}$)$_2$NOC—C$_6$H$_4$—CON(C$_8$H$_{17}$(n))$_2$ | 77.1 | 14.7 | — |
| S-41 | (C$_2$H$_5$)$_2$—NCO—(CH$_2$)$_8$—CON(C$_2$H$_5$)$_2$ | 40.7 | 8.9 | 405 |
| S-42 | 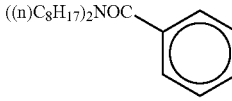 CH$_3$—C$_6$H$_4$—SO$_2$N(C$_4$H$_9$(n))$_2$ | 49.65 | 10.4 | — |

Compound represented by Formula[S-7]

| | | | | |
|---|---|---|---|---|
| S-43 | 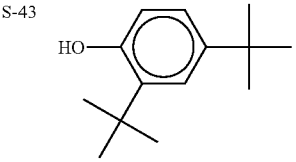 HO—C$_6$H$_3$(t-Bu)$_2$ | 92 | 16.9 | — |

Compound represented by Formula[S-8]

| | | | | |
|---|---|---|---|---|
| S-44 | 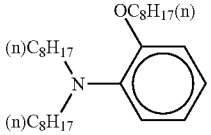 ((n)C$_8$H$_{17}$)$_2$N—C$_6$H$_4$—OC$_8$H$_{17}$(n) | 15.5 | 4.6 | — |
| S-45 | 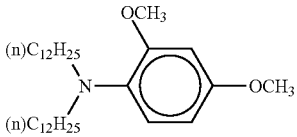 ((n)C$_{12}$H$_{25}$)$_2$N—C$_6$H$_3$(OCH$_3$)$_2$ | 27.1 | 6.6 | — |
| S-46 | 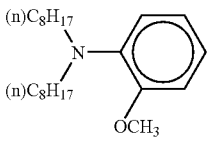 ((n)C$_8$H$_{17}$)$_2$N—C$_6$H$_4$—OCH$_3$ | 35.3 | 8.0 | — |
| S-47 | 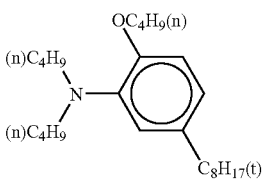 ((n)C$_4$H$_9$)$_2$N—C$_6$H$_3$(OC$_4$H$_9$(n))(C$_8$H$_{17}$(t)) | 79.14 | 15.0 | — |

| Compound represented by Formula[S-9] | | | | |
|---|---|---|---|---|
| S-48 | 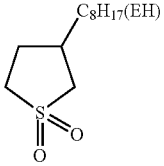 $C_8H_{17}(EH)$ | 37.62 | 8.4 | — |
| S-49 | 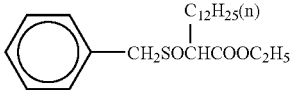 $C_{12}H_{25}(n)$, $-CH_2SOCHCOOC_2H_5$ | 43.1 | 9.3 | — |
| Other compounds | | | | |
| S-50 | $C_nH_{2n+1}$ (normal paraffin, mixture of compounds wherein n is 14 or 15) (for example, "NP—SH", manufactured by Mitsui-Texaco Chemicals) | 2.47 | 0.4 | 260 |
| S-51 | 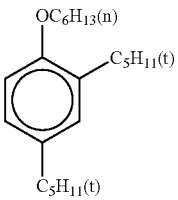 $OC_6H_{13}(n)$, $C_5H_{11}(t)$, $C_5H_{11}(t)$ | 35.85 | 8.1 | 330 |
| S-52 | 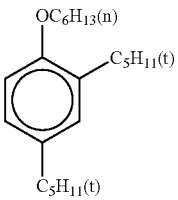 $C_8H_{17}(n)$, $C_8H_{17}(n)$ | 45.9 | 9.8 | — |
| S-53 | 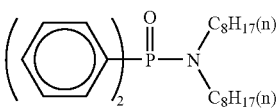 $CH_2COOC_4H_9(n)$, $HO-C-COOC_4H_9(n)$, $CH_2COOC_4H_9(n)$ | 25.82 | 6.7 | — |

The high boiling point organic solvent may be used alone or in combination of two or more thereof [e.g., tricresylphosphate and dibutyl phthalate, trioctylphosphate and di(2-ethylhexyl)sebacate, dibutyl phthalate and poly(N-t-butylacrylamide)].

Other examples of the high boiling point organic solvents except for the above-described compounds, and the method for synthesizing these high boiling point organic solvents are, for example, described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Application Laid-Open (EP-A) Nos. 276,319A, 286,253A, 289,820A, 309,158A, 309,159A, 309,160A, 509,311A, and 510,576A, East German Patent Nos. 147,009, 157,147, 159,573, and 225,240A, U.K. Patent No. 2,091,124A, and JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946, and 4-346338.

In the present invention, high boiling point organic solvents having a boiling point higher than 100° C. are preferable, and high boiling point organic solvents having a boiling point higher than 170° C. are more preferable.

The amount of the addition of the high boiling point organic solvent to the second liquid B is preferably in the range of 50% by mass to 100% by mass, more preferably 70% by mass to 100% by mass, and most preferably 90% by mass to 100% by mass based on the total weight of the liquid.

The first liquid A is prepared so that the difference of the sp value between the first liquid A and the second liquid B is 10 or less. When the difference between the sp value of the second liquid B that is applied before applying the first droplet a1 and the sp value of first droplet a1 is 10 or less, affinity between the second liquid B and first droplet a1 can be increased, and droplets are effectively prevented from being fused to each other when succeeding droplet a2 is applied in contact with droplet a1. The difference of the sp value is preferably 5 or less.

When the difference of the sp values between the first liquid A and the second liquid B falls within the above-described range, affinity between the first liquid A and the second liquid B is improved since the liquids are readily soluble to each other and the contact area between the droplet a1 and the second liquid B is larger than the contact area between droplet a1 and droplet a2. Accordingly, when droplet a1, droplet a2 and so on that are applied having overlap portions to each other contain a colorant, blurring of the color and mixing of the color between droplet a1, droplet a2 is prevented from occurring, and the width of the colored line is prevented from being irregular.

The sp value can be favorably adjusted by using the lipophilic solvent and polymerizable compound. For example, the sp value may be reduced by increasing the proportion of the lipophilic solvent in the droplet.

Preferable embodiment of the invention include:

(1) the first liquid A containing the polymerizable or crosslinkable compound, and the second liquid B containing the polymerization initiator;

(2) the first liquid A containing polymerizable or crosslinkable compound and colorant, and the second liquid B containing the polymerization initiator; and (3) the first liquid A containing polymerizable or crosslinkable compound and colorant, and the second liquid B containing the polymerization initiator and lipophilic solvent.

The polymerizable or crosslinkable compound may be contained in the first liquid A as well as in the second liquid B in the range not impairing the effect of the invention. The polymerization initiator may be contained in the second liquid B of the invention as well as in the first liquid A in the range not impairing the effect of the invention.

The ink-jet recording ink set of the invention may contain the polymerizable or crosslinkable compound for forming an image in the first liquid A, while the first liquid A and the second liquid B, if necessary, contain a polymer having a heterocyclic residue for forming a colorant. The second liquid B preferably has a sp value of 35 or less while the first liquid A and the second liquid B are preferably formulated so that the difference of the sp value between them is 10 or less.

When an image is recorded on a low liquid-absorbing recording medium such as a impermeable or slow-permeable recording medium, in particular, adjoining droplets (droplet a1 and droplet a2 of the first liquid A), which have been applied with overlap portions to each other in order to obtain high image density and remain on the recording medium before drying and are in contact to each other, are fused to each other. As a result, a sharp image is hardly formed since the image is blurred and the line width of thin lines becomes irregular. However, droplet a1 and droplet a2 are prevented from being fused to each other even by applying droplet a1 and droplet a2 with overlap portions to each other, and blurring of the image and irregular line width of thin lines in the image can be effectively prevented from occurring, when the second liquid B is formulated to have a specified sp value before applying droplet a1 and droplet a2 of the first liquid A. Consequently, it is possible to form sharp lines with uniform line width while resolution of the high density image is maintained, and to record a high quality image.

(Components Other Than Those Described Above)

Other components such as known additives may be used in combination depending on the object.

—Surfactant—

The ink set of the invention preferably contains a surfactant as will be described below for forming ink dots having a desired size on the recording medium, and it is favorable that the second liquid B contains at least one surfactant. The surfactant will be described in detail below.

—Storage Stabilizer—

Storage stabilizers may be added to the first liquid A and the second liquid B (preferably the first liquid A) according to the present invention for the purpose of inhibiting undesirable polymerization during storage. The storage stabilizers are preferably used in combination with polymerizable or crosslinkable compounds, and are preferably soluble in the contained droplets or liquids, or other coexisting components.

Examples of the storage stabilizer include quaternary ammonium salts, hydroxy amines, cyclic amides, nitrites, substituted ureas, heterocycle compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monomethyl ether, hydroquinone monobutyl ether, and copper naphthenate.

The amount of addition of the storage stabilizer is preferably adjusted on the basis of the activity of the polymerization initiator, polymerizability of the polymerizable or crosslinkable compounds, and the kind of the storage stabilizer, and preferably 0.005 to 1% by mass, more preferably 0.01 to 0.5% by mass, and further preferably 0.01 to 0.2% by mass on the basis of the solid content in the liquid, from the viewpoint of the balance between the storage stability and curability.

—Electrically Conductive Salts—

Electrically conductive salts are solid compounds for improving electrical conductivity. In the present invention, it is preferable not to substantially use the salts because they tend to precipitate during storage. However, they may be added in an appropriated amount when the solubility of the electrically conductive salts is improved by increasing the solubility of electrically conductive salts or using solvents with high solubility to the electrically conductive salts.

Examples of the above-described electrically conductive salts include potassium thiocyanate, lithium nitrate, ammonium thiocyanate, and dimethylamine hydrochloride salt.

—Solvent—

In the present invention, solvents other than the above-described high boiling point organic solvents may be used. The solvents can be used for the purposes of adjusting the polarity, viscosity, and surface tension of the liquid (ink), improving the solubility and dispersibility of the colorants, adjusting electrical conductivity, and adjusting printing performance.

The solvents are preferably water-insoluble liquids containing no aqueous solvent for quick-drying properties and recording a high quality image having a uniform line width, thus the liquid (ink) preferably comprise an above-described high boiling point organic solvent.

Examples of the solvent include low-boiling organic solvents having a boiling point of 100° C. or lower, but it is preferable not use such low-boiling organic solvents because they may affect the curability and may cause environmental pollution. If a low-boiling organic solvent is used, it is preferable to use a highly safe one. Highly safe solvents are solvents for which a high control concentration (an index defined in the work environmental evaluation criteria) has been defined. The control concentration is preferably 100 ppm or higher, more preferably 200 ppm or higher. Examples of the highly safe solvents include alcohols, ketones, esters, ethers, and hydrocarbon, and specific examples thereof include methanol, 2-butanol, acetone, methyl ethyl ketone, ethyl acetate, and tetrahydrofuran.

The solvents may be used alone or in combination of two or more thereof. However, when at least one of water and a low-boiling organic solvent is used, the content of them in each liquid is preferably 0 to 20% by mass, more preferably 0 to 10% by mass, and most preferably substantially free. It is not preferable that the first liquid A and the second liquid B according to the present invention contain water from the viewpoints of temporal stability such as development of unevenness with time, and development of liquid turbidity due to precipitation of dyes, and drying properties on an impermeable or slow-permeable recording medium. Substantially free means that the presence of inevitable impurities is acceptable.

—Other Additives—

Furthermore, known additives such as a polymer, a surface tension adjuster, an ultraviolet absorbing agent, an antioxidant, an antifading agent, and pH adjuster may be added into at least one of the first liquid A and the second liquid B.

As surface tension adjusters, ultraviolet absorbing agent, antioxidant, antifading agent, and pH adjuster, known compounds may be used as appropriate. Specific examples thereof include the additives as described in JP-A No. 2001-181549.

In addition to the above-described compounds, a pair of compounds which react with each other by mixing to form an aggregate or thicken may be separately contained in the first liquid A and the second liquid B according to the present invention. The above-described pair of compounds has properties of rapidly forming an aggregate or rapidly thickening the liquid, thereby coalescence between neighboring droplets is more effectively inhibited.

Examples of the reaction between the above-described pair of compounds include an acid-base reaction, a hydrogen bond reaction between a carboxylic acid group-containing compound and an amide, a crosslinking reaction such as those between boronic acid and a diol, and a reaction by electrostatic interaction between a cation and an anion.

The ink-jet recording method of the invention will be described in detail below.

The ink-jet recording ink set is used in the ink-jet recording method of the invention, and the second liquid B is applied on an area corresponding to the image to be formed on a recording medium with the first liquid A or an area wider than the area corresponding to the image, before application of the first liquid A. Since dispersion breakage due to the shock by collision and mixing of two droplets caused by application of the liquids can be avoided by using the ink-jet recording ink set of the invention, high density images excellent in transparency with fewer mixing and blurring of the color can be recorded.

Since the second liquid B is applied on the recording medium in advance to application of the first liquid A, fusion between the droplets of the first liquid A, for example between droplet a1 and droplet a2, can be suppressed even when the droplets of the first liquid A (for example droplet a1 and droplet a2) are applied so as to overlap to each other, and blurring of the image and irregular line width of thin lines in the image can be efficiently prevented. Consequently, sharp lines with uniform line width can be formed while resolution of the high quality image is maintained. And a high quality image can be recorded. The image is excellent in abrasion resistance, light resistance and ozone resistance without stickiness. The ink set is particularly effective when the sp value of the second liquid B is 35 or less (preferably 30 or less) and the difference of the sp value between the first liquid A and the second liquid B is 10 or less.

The first liquid A containing droplet a1 and droplet a2 as a liquid for forming an image, and the second liquid B having a composition different from that of the first liquid A are used in the invention. Droplet a1 and droplet a2 belong to droplets a1, a2, a3 and so on up to ax applied from the ink ejection port using a single liquid of the fist liquid A, and they are preferably applied so as to overlap to each other. While the droplets may be simultaneously applied or may be preceding and succeeding droplets in relation of preceding and succeeding application, and the preceding and succeeding droplets is preferable.

More preferably, droplet a2 of the first liquid A is applied so as to overlap droplet a1 that has been applied in advance to the following droplet a2 after the application of the droplet a1 of the first liquid A when droplet a1, droplet a2 and so on of the first liquid A are applied from the ink ejection port (head) of the ink-jet printer to form the appropriate image.

In the ink-jet recording method according to the invention, droplets a1 and a2 of the first liquid A described above are ejected, for example, through an ink-jet nozzle, but the second liquid B may not be ejected through an ink-jet nozzle but may be applied by other means such as coating.

Hereinafter, the method of applying the second liquid B on a recording medium will be described. In the description below, a method of using an ink-jet nozzle was used as the method of applying the droplets a1 and a2 of the first liquid A as described above. Typical examples are shown below.

(i) Application with Coater

It is a preferable embodiment that the second liquid B is applied to a recording medium using a coater, subsequently the droplets a1 and a2 (the first liquid A) are applied by an ink jet nozzle to record an image.

The coater is not particularly limited, and can be appropriately selected from known coaters according to the intended use. Examples of the coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki.

The ink jet nozzle is not particularly limited, and can be appropriately selected from known nozzles according to the intended use. The ink-jet recording method will be described later.

Furthermore, liquids other than the droplet a1 and droplet a2 of the first liquid A, and the second liquid B may be used for forming an image. The other liquids may be applied to a recording medium by any methods such as the above-described coating using coaters or ejection using an ink jet nozzle. The timing of application is not particularly limited. Another liquid containing a colorant is preferably injected using an ink jet nozzle, and preferably applied after applying the second liquid B.

(ii) Ejection with Ink Jet Nozzle

It is a preferred embodiment to record an image by applying the second liquid B as droplet b1, droplet b2, droplet b3 and so on up to droplet bx using an ink jet nozzle, followed by applying the droplet a1, droplet a2, droplet a3 and so on up to droplet ax of the first liquid A using an ink jet nozzle. The ink jet nozzle is the same as described above.

In such a case too, the liquid other than the droplets a1 and a2 of the first liquid A and the second liquid B may be applied on the recording medium in any way, for example, in a coating machine or by ejection through an ink-jet nozzle, and the timing of application is also not particularly limited. When the other liquid contains a colorant, it is preferably applied by ejection through an ink-jet nozzle, preferably, additionally after application of the second liquid B through a nozzle.

The method of ejection through ink-jet nozzle (ink-jet recording process) is the same as that above.

The ejection method with an ink-jet nozzle (ink-jet recording method) will be described below.

Examples thereof include an electric charge-controlled method of ejecting ink by electrostatic attraction, a drop-on-demand method (pressure pulse method) of using the vibrational pressure of a piezoelectric element, an acoustic ink-jet method of ejecting ink by converting electric information into acoustic beams, irradiating the beams on ink, and generating an radiation pressure, a thermal ink-jet method (bubble jet (registered trademark)) of forming air bubbles by the pressure generated by heating, and the like.

The ink-jet recording process also include a method of ejecting a so-called low-concentration photo ink multiple times in droplets in smaller volume, a method of improving image quality by using multiple different inks that are substantially the same in color tone and different concentration, and a method of using a transparent colorless ink.

In instances where the above-described application means (i) is used, at least the droplet a1 and droplet a2 of the first liquid A are applied by the ink jet recording process on the second liquid B which has been applied on the recording medium in advance, thereby an image is formed. In instances where the above-described application means (ii) is used, at least the droplet a1 and the droplet a2 of the first liquid A are applied by the ink jet recording process on the second liquid B which has been applied on the recording medium by the ink jet recording process in advance, thereby an image is formed.

In the present invention, the droplet a1 and droplet a2 has an overlap portion, which increases the number of applied droplets per unit length, and thereby allows image recording at a high resolution. In this instance, it is preferable to apply the droplet a1 and droplet a2 within 1 second after applying the second liquid B on a recording medium.

The overlap ratio of droplets at an overlap portion refers to a value measured at the time of 1 second after at least the droplet a1 and droplet a2 are overlappedly applied. In particular, the overlap ratio at an overlap portion at the time of 1 second after the droplet a1 and droplet a2 are applied is preferably 10% to 90%, since it is effective for image recording with higher resolution.

Furthermore, the overlap ratio is more preferably 20% to 80%, and furthermore preferably 30% to 70%.

The above-described overlap ratio is an index showing the ratio of overlapping between neighboring droplets (droplet ab 1, droplet a2 and so on). When the diameter of a droplet applied on a recording medium is set at a and the portion of ½a is overlapped, the overlap ratio is 50%. In the present invention, neighboringly applied droplets can keep the applied shape without causing coalescence, and the overlap ratio is represented by 100×(2b-c)/2b [%], wherein b is the radius of the droplet measured at point in time of 1 second after application, and c is the distance interval of the neighboringly applied droplets.

The amount of application of the droplet a1 and the droplet a2 of the first liquid A is not particularly limited, and can be selected in accordance with the sharpness of the image to be formed. Usually, the amount is preferably about 0.5 pl (picoliters; hereinafter the same shall apply) to 10 pl per droplet. Furthermore, application of the second liquid B is not particularly limited as long as it is applied to the same area with or a wider area than the image area formed by the droplet a1 and droplet a2 of the first liquid A.

Concerning the proportion of the applied amount of the second liquid B per one droplet of the droplet a1 and the droplet a2 of the first liquid A, when the amount of the droplet a1 or droplet a2 is 1, the amount of application of the second liquid B (mass ratio) is preferably in the range of 0.05 to 5, more preferably in the range of 0.07 to 1, and most preferably in the range of 0.1 to 1.

At least one of the droplet a1 and droplet a2 of the first liquid A is preferably applied at a droplet size of 0.1 pl to 100 pl (preferably from an ink jet nozzle). When the droplet size is within the above-described range, an image with high sharpness can be advantageously formed at a high density. Furthermore, the size is more preferably 0.5 pl to 50 pl.

A time interval between finishing of the application of the second liquid B and the starting of the application of droplet a1 of the first liquid A is in the range of 5 µseconds to 400 m seconds. When the time interval is within the above-described range, the effect of the present invention is advantageously achieved. The time interval is more preferably 10 µseconds to 300 m seconds, and most preferably 20 µseconds to 200 µseconds.

(Physical Properties of the Fist Liquid A and the Second Liquid B)

The first liquid A (droplet) and the second liquid B (droplet) ejected on the recording medium by the ink-jet recording method preferably have a viscosity in the range of 5 to 100 mPa·s, more preferably 10 to 80 mPa·s at 25° C., although the viscosity differs depending on the printer. The difference of viscosity (25° C.) between the first liquid A and the second liquid B is preferably within a range of 25 mPa·s or less.

From the viewpoint of forming a desired size of dots of the fist liquid A on the recording medium, the second liquid B preferably contains the surfactant, and the ink-jet recording ink set of the invention preferably satisfies all the following conditions (A), (B) and (C):

(A) the surface tension of the second liquid B is smaller than that of at least one of the first liquid A contained in the ink-jet recording ink set;

(B) at least one of the surfactants contained in the second liquid B satisfies the following relationship:

$$\gamma^s(0)-\gamma^s(\text{saturated})>1 \text{ mN/m; and}$$

(C) the surface tension of the second liquid B satisfies the following relationship:

$$\gamma^s<(\gamma^s(0)+\gamma^s(\text{saturated})^{max})/2.$$

Wherein, $\gamma^s$ represents the surface tension of the second liquid B; $\gamma^s(0)$ represents the surface tension of a liquid obtained by eliminating all surfactants from the second liquid B; $\gamma^s(\text{saturated})$ represents the saturated surface tension of the liquid obtained by eliminating all surfactants from the second liquid B when one of the surfactants contained in the second liquid B is added to the liquid obtained by eliminating all surfactants from the second liquid B until the surface tension thereof becomes saturated; and $\gamma^s(\text{saturated})^{max}$ represents the maximum value of the $\gamma^s(\text{saturated})$ values of all surfactants satisfying the condition (B) contained in the second liquid B.

(Condition (A))

In the invention, as described above, the surface tension of the second liquid B $\gamma^s$ may be smaller than the surface tension $\gamma^k$ of at least one of the first liquid A contained in the ink-jet recording ink set, for forming the first liquid A dot in a desirable size on a recording medium.

For more effective prevention of the spread of the first liquid A dot during the period from ejection (application of the ink droplet) to exposure, more preferably, $\gamma^s<\gamma^k-3$ (mN/m), and still more preferably, $\gamma^s<\gamma^k-5$ (mN/m).

In printing a full color image, the surface tension of the second liquid B $\gamma^s$ is preferably at least lower than that of the first liquid A containing a colorant higher in visual sensitivity, more preferably lower than the surface tension of any first liquid As contained in the ink-jet recording ink set, for improvement of the image sharpness. The colorant higher in visual sensitivity is, for example, a magenta, black, or cyan colorant.

Even when the surface tension of the first liquid A $\gamma^k$ and the surface tension of the second liquid B $\gamma^s$ satisfy the relationship above, if the both values are less than 15 mN/m, it may become difficult to form droplets during ink-jet ejection, leading to ejection failure. On the other hand, the values of more than 50 mN/m may lead to deterioration in wettability with the ink-jet head, causing a problem of ejection failure. Accordingly, for more favorable ejection, the surface tension of the first liquid A $\gamma^k$ and the surface tension of the second liquid B $\gamma^s$ are preferably both 15 mN/m or more and 50 mN/m or less, more preferably 18 mN/m or more and 40 mN/m or less, and particularly preferably 20 mN/m or more and 38 mN/m or less.

The surface tension is a value determined according to Wilhelmy method at a liquid temperature of 20° C. and 60% RH by using a commonly used surface tension balance (for example, surface tension balance CBVP-Z, manufactured by Kyowa Interface Science Co., Ltd.).

(Conditions (B) and (C))

The second liquid B preferably contains at least one surfactant for forming ink dots having a desired size in the invention. At least one surfactant of the surfactants contained in the second liquid B preferably satisfies following condition (B):

$$\gamma^s(0)-\gamma^s(\text{saturated}) > 1 \text{ mN/m} \qquad \text{condition (B)}$$

In addition, the surface tension of the second liquid B preferably satisfies following condition (C):

$$\gamma^s < (\gamma^s(0)+\gamma s(\text{saturated})^{max})/2 \qquad \text{condition (C)}$$

In the Formula, $\gamma^s$ represents the surface tension of the second liquid B; $\gamma^s(0)$ represents the surface tension of a liquid obtained by eliminating all surfactants from the second liquid B; $\gamma^s(\text{saturated})$ represents the saturated surface tension of the liquid obtained by eliminating all surfactants from the second liquid B when one of the surfactants contained in the second liquid B is added to the liquid obtained by eliminating all surfactants from the second liquid B until the surface tension thereof becomes saturated; and $\gamma^s(\text{saturated})^{max}$ represents the maximum value of the $\gamma^s(\text{saturated})$ values of all surfactants satisfying the condition (B) contained in the second liquid B.

The $\gamma^s(0)$ value is determined by measuring the surface tension of the liquid obtained by eliminating all surfactants from the second liquid B. The $\gamma^s(\text{saturated})$ value is determined by measuring the surface tension of the liquid obtained by eliminating all surfactants from the second liquid B when one of the surfactants contained in the second liquid B is added to the liquid obtained by eliminating all surfactants from the second liquid B and the concentration of the surfactant is increased stepwise at an interval of 0.01% by mass until the change in surface tension becomes 0.01 mN/m or less.

Hereinafter, $\gamma^s(0)$, $\gamma^s(\text{saturated})$, and $\gamma^s(\text{saturated})^{max}$ will be described specifically.

For example, when the components for the second liquid B (Example 1) are a high boiling point organic solvent (diethyl phthalate, manufactured by Wako Pure Chemical Industries, Ltd. ), a polymerization initiator (TPO-L, exemplary compound, initiator 1), a fluorochemical surfactant (Megaface F475, manufactured by Dainippon Ink and Chemicals Inc.), and a hydrocarbon based surfactant (sodium di-2-ethylhexylsulfoscuccinate), $\gamma^s(0)$, $\gamma^s(\text{saturated})^1$ (when a fluorochemical surfactant is added), $\gamma^s(\text{saturated})^2$ (when a hydrocarbon based surfactant is added), $\gamma^s(\text{saturated})$, and, $\gamma^s(\text{saturated})^{max}$ are respectively as follows:

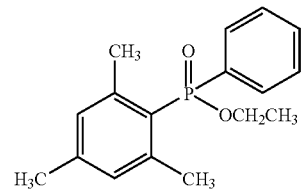

Initiator-1

$\gamma^s(0)$, the surface tension of the liquid obtained by eliminating all surfactants from the second liquid B, was 36.7 mN/m. $\gamma^s(\text{saturated})^1$, the saturated surface tension of the liquid obtained by eliminating all surfactants from the second liquid B when a fluorochemical surfactant is added thereto until the surface tension thereof becomes saturated, was 20.2 mN/m. $\gamma^s(\text{saturated})^2$, the saturated surface tension of the liquid obtained by eliminating all surfactants from the second liquid B when a hydrocarbon based surfactant is added thereto until the surface tension thereof becomes saturated, was 30.5 mN/m.

The second liquid B (Example 1) contains two surfactants satisfying the condition (B), and thus, has two $\gamma^s(\text{saturated})$ values: $\gamma^s(\text{saturated})^1$ when a fluorochemical surfactant is added and $\gamma^s(\text{saturated})^2$ when a hydrocarbon based surfactant is added. Accordingly, $\gamma^s(\text{saturated})^{max}$, the maximum value between $\gamma^s(\text{saturated})^1$ and $\gamma^s(\text{saturated})^2$ above, is $\gamma^s(\text{saturated})^2$.

In summary, $$\gamma^s(0)=36.7 \text{ mN/m},$$

$\gamma^s(\text{saturated})^1 = 20.2$ mN/m (when a fluorochemical surfactant is added), $\gamma^s(\text{saturated})^2 = 30.5$ mN/m (when a hydrocarbon-based surfactant is added), and $$\gamma^s(\text{saturated})^{max}=30.5 \text{ mN/m}.$$

Accordingly, the surface tension of the second liquid B $\gamma^s$ satisfies the following relationship:

$$\gamma^s<(\gamma^s(0)+\gamma^s(\text{saturated})^{max})/2=33.6 \text{ mN/m}.$$

As for the condition (C), for more effective prevention of spread of the ink droplet during the period from ejection to exposure, the surface tension of the second liquid B more preferably satisfies the following relationship:

$$\gamma^s < \gamma^s(0) - 3 \times \{\gamma^s(0)-\gamma^s(\text{saturated})\}/4,$$

and particularly preferably the following relationship:

$$\gamma^s \leq \gamma^s(\text{saturated}).$$

The surface tension is a value determined according to Wilhelmy method at a liquid temperature of 20° C. and 60% RH by using a commonly used surface tension balance (for example, surface tension balance CBVP-Z, manufactured by Kyowa Interface Science Co., Ltd.).

(Surfactant)

The second liquid B according to the invention preferably contains at least one surfactant, as described above, for forming an ink dot in a desirable size on a recording medium.

The surfactant according to the invention is a substance having a strong surface activity to at least one solvent selected from hexane, cyclohexane, p-xylene, toluene, ethyl acetate, methyl ethyl ketone, butyl carbitol, cyclohexanone, triethylene glycol monobutylether, 1,2-hexanediol, propylene glycol monomethylether, isopropanol, methanol, water, isobornyl acrylate, 1,6-hexane diacrylate, and polyethylene glycol diacrylate; preferably, a substance having a strong surface activity to at least one solvent selected from hexane, toluene, propylene glycol monomethylether, isobornyl acrylate, 1,6-hexane diacrylate, and polyethylene glycol diacrylate; more preferably, a substance having a strong surface activity to at least one solvent selected from propylene glycol monomethylether, isobornyl acrylate, 1,6-hexane diacrylate, and polyethylene glycol diacrylate; and particularly preferably, a substance having a strong surface activity to at least one solvent selected from isobornyl acrylate, 1,6-hexane diacrylate, and polyethylene glycol diacrylate.

It is possible to determine whether a compound is the substance having a strong surface activity to the solvents listed above according to the following procedure.

(Procedure)

A solvent is selected from the solvents listed above, and the surface tension of the solvent γ(0)(solvent) is determined. The compound is added to the solvent of which the γ(0)(solvent) is determined; the concentration of the compound is increased stepwise at an concentration interval of 0.01% by mass until the change in surface tension become not larger than 0.01 mN/m; and then the surface tension of the solution γ(saturated)(solvent) is determined. If the relationship between the γ(0)(solvent) and the γ(saturated)(solvent) satisfies the following formula, the compound is judged to be a substance having a strong surface activity to the solvent.

$$\gamma(0)(solvent)-\gamma(saturated)(solvent)>1 \text{ mN/m},$$

Typical examples of the surfactants contained in the second liquid B include anionic surfactants such as dialkyl sulfosuccinate salts, alkylnaphthalenesulfonate salts, and fatty acid salts; nonionic surfactants such as polyoxyethylene alkylethers, polyoxyethylene alkylallylethers, acetylene glycols, and polyoxyethylene-polyoxypropylene block copolymers; cationic surfactants such as alkylamine salts and quaternary ammonium salts; fluorochemical surfactants; and the like. Examples of the other surfactants include those described in JP-A Nos. 62-173463, and 62-183457.

In the method according to the invention, the formed image may be hardened by application of energy as described above after applying the second liquid B and then first liquid As (for example, droplets a1 and a2) from the viewpoint that it is possible to obtain better fixing efficiency.

The application of energy promotes the curing reaction due to polymerization or crosslinking of the polymerizable compound contained in the liquids; thereby a more solid image is more effectively formed. For example, in a system containing a polymerization initiator, the application of active energy such as activation light and heat promotes the generation of active species due to the decomposition of the polymerization initiator, and the increased active species and temperature promote the curing reaction of the polymerizable or crosslinkable compound due to polymerization or crosslinking caused by the active species.

The application of energy may be appropriately carried out by activation light irradiation or heating.

As the above-described activation light, for example, ultraviolet light, visible light, as well as αray, γray, X ray, and electron beam or the like may be used. Among them, ultraviolet light and visible light are preferable, and ultraviolet light is most preferable from the viewpoints of cost and safety.

While the amount of energy necessary for curing reaction is different depending on the kind and content of the polymerization initiator, it is usually about 1 to 500 mJ/cm$^2$.

When energy is applied by heating, the heating treatment is preferably carried out for 0.1 to 1 second under conditions that the surface temperature of the recording medium is in the range of 40 to 80° C.

The heating treatment may be carried out by a non-contact type heating method. Preferable examples of the heating method include a heating method of passing through a heating furnace such as an oven, and a heating method by whole surface exposure with ultraviolet light to visible light to infrared light or the like. Examples of the light source suitable for exposure as a heating method include a metal halide lamp, a xenon lamp, a tungsten lamp, a carbon arc lamp, and a mercury lamp.

While a step for hardening the second liquid B with the above-mentioned active light may be inserted between the application of the second liquid B and the first liquid A, the second liquid B applied in advance on the recording medium is desirably maintained in a liquid state until the application of the first liquid A. Accordingly, the second liquid B is not hardened at all, or is semi-hardened in this aspect.

—Recording Medium—

Any of a permeable recording medium, impermeable recording medium and slow-permeable recording medium may be used as the recording medium in the ink-jet recording method of the invention. The impermeable or slow-permeable recording medium is preferable in terms of more efficiently exhibiting the effect of the invention.

The droplets may be fused to each other by permitting neighboring droplets (ink A and ink B) applied so as to overlap to each other to remain on the recording medium and contact to each other before drying, when the image is recorded on a recording medium having low ink absorbability. Consequently, blurring of images, color mixing, irregular line width of thin lines, and uneven ends of the image due to swelling of the end of the image may easily occur. However, droplets can be suppressed from fusing to each other when droplets of the fist liquid A are applied so as to have overlap portions to each other by applying the second liquid B on an area corresponding to the image to be formed on a recording medium with the first liquid A or an area wider than the area corresponding to the image, before application of the first liquid A. This permits irregular line width in the image formed by applying the droplet, distortion of a gridline and uneven ends of the image due to swelling of the end of the image to be effectively prevented from appearing. Consequently, high quality images can be recorded without blurring, with good quality of thin lines (including uniformity of line width) and with uniform ends of the image. The image is not sticky and is excellent in scratch resistance.

In this case, the permeable recording medium is defined as a medium having a time necessary for allowing the total volume of the liquid to permeate into the recording medium of 100 msec or less when 10 pl (picoliters) of the droplet is added dropwise onto the recording medium. Specific examples of the permeable recording medium are plain paper and porous paper. The droplet does not substantially permeate into the impermeable recording medium, and examples of the impermeable recording medium are synthetic resin and glass. The phrase "does not substantially permeate" refers to a medium having a permeation ratio of 5% or less after 5 minutes when a droplet is added dropwise onto the medium. The slow-permeable medium shows a permeation time of 100 msec or more before the total volume of the droplet is permeated into the medium when 10 pl of a droplet is added dropwise onto the recording medium. A specific example of the slow-permeable recording medium is art paper. Details of the impermeable or slow-permeable recording medium will be described below.

Examples of the permeable recording medium include plain paper, porous paper and other media capable of absorbing the liquid.

Examples of the impermeable or slow-permeable recording medium include art paper, synthetic resin, rubber, resin coated paper, glass, metal, ceramic and wood. These materials may be used in combination of two or more as composite substrates for the purpose of adding functions.

As the above-described synthetic resin, any synthesis resins may be used. Examples thereof include polyester such as polyethylene terephthalate, and polybutadiene terephthalate, polyolefin such as polyvinyl chloride, polystyrene, polyethylene, polyurethane, and polypropylene, acrylic resin, polycarbonate, acrylonitrile-butadiene-styrene copolymer, diacetate, triacetate, polyimide, cellophane, and celluloid. The thickness and shape of these synthesis resins are not particularly limited, and the shape may be either film, card, or block form. Furthermore, the resins may be either transparent or opaque.

The above-described synthesis resin is preferably used in film form which is suitable for so-called soft packaging, and examples thereof include various non-absorbing plastics and films thereof. Examples of the plastic film include a PET film, an OPS film, an OPP film, a PNy film, a PVC film, a PE film, and a TAC film. Other examples of the plastics include polycarbonate, acrylic resin, ABS, polyacetal, PVA, and rubbers.

Examples of the above-described resin coated paper include a transparent polyester film, an opaque polyester film, an opaque polyolefin resin film, and a paper support laminated with a polyolefin resin on both sides. Among them, a paper support laminated with a polyolefin resin on both side surfaces is most preferable.

The above-described metal is not particularly limited, and preferable examples thereof include aluminum, iron, gold, silver, copper, nickel, titanium, chromium, molybdenum, silicon, lead, zinc, stainless steel, and composite materials thereof.

Furthermore, read-only optical disks such as CD-ROM and DVD-ROM, write-once optical disks such as CD-R and DVD-R, and re-writable optical disks can be used, and an ink receiving layer and a brightening layer may be added to the label surface.

The first liquid A (droplets a1, a2 and so on) and the second liquid B used in the ink-jet recording method of the invention, and each component formulating these liquids are as described previously.

Hereinafter, favorable embodiments of the invention will be described, but the invention is not limited thereto.

<1> An ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment.

<2> The ink-jet recording ink set of <1>, wherein the polymer contains a repeating

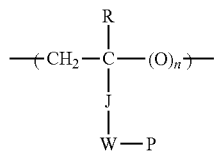

Formula (1)

unit represented by formula (1):

wherein, in the formula, R represents a hydrogen atom or methyl group; J represents —CO—, —COO—, —CONR$^1$—, —OCO—, a methylene group or a phenylene group; R$^1$ represents a hydrogen atom, alkyl group, aryl group or aralkyl group; W represents a single bond or divalent linking group; P represents the heterocyclic residue for forming the colorant; and n denotes 0 or 1.

<3> The ink-jet recording ink set of <2>, wherein P in formula (1) is a group derived from at least one selected from the group consisting of quinacridone, benzimidazolone, indole, quinoline, carbazole, acridine, acridone and anthraquinone.

<4> The ink-jet recording ink set of <1>, wherein the polymer is a graft copolymer further containing, as a copolymerization unit, a repeating unit derived from a polymerizable oligomer (macro-monomer) having an ethylenic unsaturated double bond at a terminal thereof.

<5> The ink-jet recording ink set of <1>, wherein the first liquid A contains at least a polymerizable compound or crosslinkable compound.

<6> The ink-jet recording ink set of <5>, wherein the second liquid B contains a polymerization initiator for permitting at least the polymerizable compound or crosslinkable compound to undergo a polymerizing or crosslinking reaction.

<7> The ink-jet recording ink set of <1>, wherein the second liquid B further contains a lipophilic solvent, and the content of the lipophilic solvent is 50% by mass or more of the total mass of the second liquid B.

<8> The ink-jet recording ink set of <7>, wherein the lipophilic solvent is a high boiling point organic solvent having a boiling point higher than 100° C.

<9> The ink-jet recording ink set of <1>, wherein the second liquid B contains no colorant, or the content of the colorant is less than 1%.

<10> An ink-jet recording method using an ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment, the method comprising applying the second liquid B on an area corresponding to the image to be formed on a recording medium with the first liquid A or an area wider than the area corresponding to the image, before application of the first liquid A.

<11> The ink-jet recording method of <10>, wherein at least a droplet a1 and a droplet a2 of the first liquid A are applied to form the image, wherein the droplet a1 and the droplet a2 have overlap portion with respect to each other.

<12> The ink-jet recording method of <11>, wherein the overlap ratio at the overlap portion is in the range of 10% to 90%.

<13> The ink-jet recording method of <10>, wherein a time interval between finishing of the application of the second liquid B and starting of the application of a droplet a1 of the first liquid A is in the range of 5 μsec to 400 msec.

<14> The ink-jet recording method of <10>, wherein the size of droplets of the first liquid A including a droplet a1 and a droplet a2 is in the range of 0.1 picoliters to 100 picoliters.

<15> The ink-jet recording method of <10>, wherein the second liquid B is maintained in a liquid state until application of the first liquid A.

<16> The ink-jet recording method of <10>, wherein at least one of the first liquid A and the second liquid B contains a polymerizable compound or crosslinkable compound, and the polymerizable compound or crosslinkable compound is polymerized or crosslinked by applying activation energy to the image after applying droplets of the first liquid A.

EXAMPLES

Hereinafter, the present invention will be described in more detail with reference to Examples, but it should be understood that the invention is not limited to the following Examples. "Part" in the example is based on the mass, unless otherwise stated.

Example 1

(Preparation of Cyan Pigment Dispersion P-1)

16 g of PB15:3 (trade name: IRGALITE BLUE GLO, manufactured by Ciba Specialty Chemicals Co.), 48 g of bis{[1-ethyl-(3-oxetanyl)]methyl}ether (trade name: OXT-221, manufactured by TOAGOSEI CO., LTD.) and 16 g of BYK-168 (trade name: manufactured by BYK Chemie Co.) were mixed and agitated by stirrer a stirrer for 1 hour. The mixture after agitation was dispersed with an Eiger mill to obtain a cyan pigment dispersion P-1.

Dispersion was performed by using zirconia beads having a diameter of 0.65 mm at a filling factor of 70% under the condition of a peripheral speed of 9 m/s and a period of 1 hour.

(Preparation of Ink-Jet Recording Ink Liquid I-1 Containing the Cyan Pigment)

Ink-jet recording ink liquid I-1 (comparative first liquid A) was prepared by dissolving the following compositions by mixing with stirring. The sp value of ink-jet recording liquid I-1 was 18, and the surface tension thereof was 32 N/m.

(Composition)
above-mentioned cyan pigment dispersion P-1: 3.75 g
bis{[1-ethyl(3-oxetanyl)]methyl}ether: 0.825 g
1-methyl-4-(2-methyloxylanyl)-7-oxabicyclo[4.1.0]heptane (trade name: CEL 3000, manufactured by Daicel Cytec Company LTD.) :9.675 g
9,10-dibutoxy anthracene: 0.75 g The sp value (25° C.) was calculated by the sp value calculating program by R. L. Smith (Tohoku University) including the values hereinafter. Compounds not containing carbon atoms were omitted from the calculation, the constituting units of polymers and polyethylene chain were defined to be saturated repeating units having chemical bonds, and the sp value of water was defined as 47.8.

(Synthesis of Pigment Dispersant)

Synthesis Example 1

—Synthesis of Monomer 1—

9(10H)acridone (9.76 parts) and t-butoxy potassium (5.6 parts) were dissolved in 30 parts of dimethylsulfoxide, and was heated at 45° C. 15.26 parts of chloromethyl styrene was added dropwise into the solution, and the solution was mixed for additional 5 hours at 50° C. The reaction solution was poured into 200 parts of distilled water with stirring, and the precipitate obtained was filtered and washed to obtain a monomer 1 (11.9 parts).

—Synthesis of Graft Polymer 1—

Methyl ethyl ketone (15 parts) was introduced into a three-neck flask purged with nitrogen, and was heated to 78° C. by stirring with a stirrer (trade name: THREE-ONE Motor, manufactured by Sinto Scientific Co., Ltd.) while nitrogen is flowed into the flask. The following independently prepared monomer solution and initiator solution were simultaneously added dropwise into the solution in 2 hours. After dripping, 0.08 parts of V-65 was added, and the solution was stirred for 3 hours by heating at 78° C. The reaction solution obtained was poured into 1000 parts of hexane with stirring, and the precipitate formed was dried by heating to obtain a graft polymer 1 (a polymer having a heterocyclic residue for forming a colorant).

(Monomer Solution)

The monomer solution was prepared by mixing the following components:
Monomer 1:3.0 parts
Polymethyl methacrylate having a methacryloyl group at the terminal (trade name: AA-6, number average molecular weight 6,000, manufactured by TOAOGOSEI CO., LTD.): 21.0 parts
3-(N,N-dimethylaminopropyl acrylamide) 6.0 parts
Methyl ethyl ketone: 45 parts (Initiator Solution)
2,2-azobis(2,4-dimethylvaleronitrile) (trade name: V-65, manufactured by Wako Pure Chemical Industries Ltd.) 0.04 parts
Methyl ethyl ketone: 9.6 parts Synthesis Example 2

Graft polymer 2 (polymer having a heterocyclic residue for forming a colorant) was obtained by the same method as in Synthesis Example 1, except that polymethyl methacrylate having a methacryloyl group at the terminal used in Synthesis Example 1 was changed to methoxypolyethyleneglycol methacrylate (trade name: NK Ester M-230G, manufactured by Shin-Nakamura Chemical Co. Ltd.).

Synthesis Example 3

—Synthesis of Monomer 2—

N-(2-hydroxyethyl)phthalimide (9.56 parts) and triethylamine (5.16 parts) were dissolved in ethyl acetate (50 parts) by mixing, and the solution was heated at 40° C. 7.76 parts of 2-methacryloyl oxyethyl isocyanate (trade name: Karenz MOI, manufactured by Showa Denko K.K.) was slowly added dropwise to this solution, and the mixture was further stirred for 7 hours at 45° C. The reaction solution obtained was extracted with ethyl acetate, the extract was washed with water and saturated saline followed by drying and concentrating to obtain monomer 2 (15.1 parts).

—Synthesis of Graft Polymer 3—

Graft polymer 3 (a polymer having a heterocyclic residue for forming a colorant) was obtained by the same method as in Synthesis Example 1, except that monomer 1 used in Synthesis Example 1 was changed to monomer 2.

(Preparation of Ink-Jet Recording Ink Liquids 1-2 to 1-4 Containing Cyan Pigment)

Ink-jet recording ink liquids 1-2 to 1-4 (the fist liquid A according to the invention) containing the cyan pigment were prepared by the same method as preparing the ink-jet recording ink liquid I-1, except that BYK-168 used for preparing cyan pigment dispersion P-1 was changed to graft polymer 1, graft polymer 2 or graft polymer 3. The sp values and surface tension of ink-jet recording ink liquids 1-2 to I-4 are shown in Table 1 below.

(Preparation of Ink-Jet Recording Ink Liquids II-1 to II-4 Containing a Magenta Pigment)

Ink-jet recording ink liquid II-1 containing a magenta pigment (Comparative first liquid A), and Ink-jet recording ink liquids II-2 to II-4 containing a magenta pigment (the fist liquid A according to the invention) were prepared by the same method as preparing ink-jet recording ink liquids I-1 and I-2 to I-4, except that PB 15:3 used for preparing cyan pigment dispersion P-1 were changed to the same mass of PV19 (trade name: Hostaparm RED E5B02, manufactured by Clariant Co.). The sp values and surface tension of the ink-jet recording ink liquids II-1 to II-4 containing a magenta pigment are shown Table 1 below.

(Preparation of Ink-Jet Recording Ink Liquid III-1 Containing No Pigment)

The ink-jet recording ink liquid III-1 was prepared by mixing the components of the following composition with stirring. The sp value and surface tension of this ink-jet recording ink liquid III-1 were 19 and 23 mN/m, respectively.

(Composition)

bis{[1-ethyl(3-oxetanyl]methyl}ether: 4.18 g 1-methyl-4-(2-methyloxylanyl)-7-oxabicyclo[4.1.0]-heptane (trade name: CEL 3000, manufactured by Daicel Cytec Company LTD.): 9.02 g MEGAFACE F475F (trade name, manufactured by Dainippon Ink & Chemicals, Inc.): 0.3 g Polymerization initiator-2 below (trade name: Irg 250, manufactured by Ciba Specialty Chemicals Co.) 1.50 g

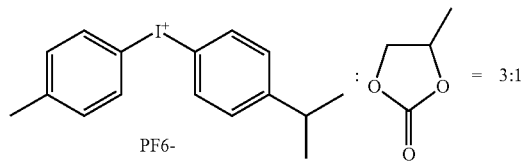

(Preparation of One-liquid Ink-jet Recording Comparative Ink Liquids I-0 and II-0)

The one-liquid ink-jet recording comparative ink liquids I-0 containing cyan pigment and one-liquid ink-jet recording comparative ink liquids II-0 containing magenta pigment were prepared by dissolving the components of the following composition with stirring.

(1) The one-liquid ink-jet recording comparative ink liquids I-0 containing cyan pigment The one-pot ink-jet recording comparative ink liquids I-0 containing a cyan pigment was prepared by dissolving the components of the following composition with stirring. The sp value and surface tension of the comparative ink liquid I-0 were 19 and 32 mN/m, respectively.

(Composition)

cyan pigment dispersion P-1: 3.75 g bis{[1-ethyl(3-oxetanyl)]methyl}ether: 0.6 g 1-methyl-4-(2-methyloxylanyl)-7-oxabicyclo[4.1.0]-heptane (trade name: CEL 3000, manufactured by Daicel Cytec Company LTD.): 8.4 g polymerization initiator-2 (trade name: IRG 250, manufactured by Ciba Specialty Chemicals Co.) 1.5 g 9,10-dibutoxyanthracene: 0.75 g (2) One-liquid ink-jet recording comparative ink liquids II-0 containing magenta pigment The ink-jet recording comparative ink liquids II-0 containing a magenta pigment was prepared by the same method as preparing comparative ink liquid I-0, except that PB 15:3 used for preparing cyan pigment dispersion P-1 was changed to an equal mass of PV19 (trade name: HOSTAPARM RED E5B02, manufactured by Clariant Co.).

The sp value and the surface tension of the each ink liquid are shown in Table 1.

TABLE 1

|  | sp value | Surface tension (mN/m) |
|---|---|---|
| I-1 | 18 | 32 |
| I-2 | 18 | 32 |
| I-3 | 18 | 32 |
| I-4 | 18 | 32 |
| II-1 | 18 | 32 |
| II-2 | 18 | 32 |
| II-3 | 18 | 32 |
| II-4 | 18 | 32 |
| III-1 | 19 | 23 |
| I-0 | 19 | 32 |
| II-0 | 19 | 32 |

(Image Recording and Evaluation)

Ink-jet recording ink liquids I-1, II-1 and III-1 prepared above were charged in an ink-jet printer and 42 pl of the each ink was ejected from three headsets (Toshiba Tech Head CA-3; equipped with four head sets, each head set is arrayed two head, the head, whose application frequency is 4.8 KHz, number of nozzles is 318, nozzle density is 150 npi (nozzle/inch) and which is variable in drop size into 7 stages between 6 to 42 pl (picoliters)). An image sample was prepared by uniformly drawing an image on the entire surface of a recording medium. The recording medium used was a polyethylene terephthalate (PET) sheet with a thickness of 60 μm (trade name: PPL/laser printer Xerox film OHP film, manufactured by Fuji Xerox Co., referred to PET sheet hereinafter).

The ink-jet recording ink liquids III-1, I-1 and II-1 were applied, in that order. The time interval between the ink liquid III-1 and the ink liquid I-1 was 400 msec, and the time interval between the ink liquid I-1 and the ink liquid II-1 was 400 msec. Ink liquid III-1 was adjusted so that the overlap ratio between neighboring droplets is 5% by controlling the transfer speed, while the overlap ratio of neighboring droplets (droplets of the fist liquid A according to the invention including droplet a1 and droplet a2) was adjusted to be 50% with respect to the ink liquids I-1 and II-1.

The overlap ratio was calculated from $100 \times (2b - c)/2b$ (%), where b denotes the radius of a droplet 1 second after the application of one droplet, and c denotes the distance between neighboring droplets.

The image sample was fixed after the application by irradiating UV light at a wavelength of 365 nm with the dose of UV light of 500 mJ/cm$^2$ using a metal halide lamp. The image was irradiated 1 second after application of II-1.

The image sample was prepared by the same method as described above, by changing the combination of inkjet recording ink liquid I-1/II-1 to the combinations of I-2/II-2, I-3/II-3 and I-4/II-4 shown in Table 2.

(Evaluation)

The image sample prepared was evaluated as follows. The results of evaluation are shown in Table 2 below.

—1. Color Mixing of Cyan and Magenta—

Each image sample was visually observed, and was evaluated as "C" when cyan and magenta were mixed to each other, and as "A" when ink droplets of respective colors are independent to each other.

—2. Evaluation of Cyan Color Density—

A image sample was formed by applying the ink liquids in the order of III-1 and I-1, III-1 and I-2, III-1 and I-3 and III-1 and I-4 (a image sample prepared by not applying II-1, II-2, II-3 and II-4 for forming the above-mentioned image sample), and was compared with the above-mentioned image sample. The difference of the cyan color density between the density of the image with the ink liquid II and the density of the image without the ink liquid II [(the cyan color density when the ink liquid II was applied)–(the cyan color density when the ink liquid II was not applied). The difference of the cyan color density is shown in Table 2 below.

micro-densitometer (trade name: MICRO-PHOTOMETER MPM-No. 172, manufactured by Union Optical Co.) to determine the residual ratio (%) of the pigment after the storage. The results were evaluated in 5 stages according to the following evaluation criteria. Only the image on the PET sheet was evaluated for the ozone resistance.

A: the residual ratio of the pigment was 90% or more;
B: the residual ratio of the pigment was from 89 to 80%;
C: the residual ratio of the pigment was from 79 to 70%;
D: the residual ratio of the pigment was from 69 to 50%; and
E: the residual ratio of the pigment was less than 49%.

TABLE 2

| Combination of the ink | Color mixing | Cyan color density | Stickiness | Abrasion resistance | Light resistance | Ozone resistance | Note |
|---|---|---|---|---|---|---|---|
| III-1, I-1 and II-1 | A | −0.1 | A | A | A | A | Comparative Example |
| III-1, I-2 and II-2 | A | 0 | A | A | A | A | The invention |
| III-1, I-3 and II-3 | A | 0 | A | A | A | A | The invention |
| III-1, I-4 and II-4 | A | 0 | A | A | A | A | The invention |
| I-0 and II-0 | C | — | A | A | A | A | Comparative Example |

—3. Evaluation of Stickiness—

The image surface of the sample image (recording surface) was touched with a finger immediately after UV irradiation, and was evaluated according to the following evaluation criteria.

(Evaluation Criteria)
A: Not sticky
B: Slightly sticky
C: Remarkably sticky

—4. Evaluation of Abrasion Resistance—

An image surface (recording surface) of a PET sheet on which an image was drawn was abraded with an eraser 10 times reciprocally 30 minutes after irradiation of UV light, and the image was evaluated according to the following evaluation criteria.

A: No decrease of color density at all by abrasion.
B: Slight decrease of color density by abrasion.
C: Remarkable decrease of color density by abrasion.

—5. Evaluation of Light Resistance—

Each image sample was irradiated with Xenon light (85,000 lux) for 1 week using a weather meter (Atras C. I 65), and the color densities before and after irradiation was measured with a micro-densitometer (trade name: MICRO-PHOTOM-ETER MPM-No. 172, manufactured by Union Optical Co.) to determine a residual ratio (%) of the pigment after the irradiation. The results were evaluated in 5 stages according to the following evaluation criteria. Only the image on the PET sheet was evaluated for the light resistance.

(Evaluation Criteria)
A: The residual ratio of pigment was 90% or more;
B: The residual ratio of pigment was from 89 to 80%;
C: The residual ratio of pigment was from 79 to 70%;
D: The residual ratio of pigment was from 69 to 50%; and
E: The residual ratio of pigment was less than 49%.

—6. Evaluation of Ozone Resistance—

Each image sample was stored in an atmosphere with an ozone concentration of 5.0 ppm for 1 week, and the image densities before and after the storage were measured with a Two colors are avoided from being mixed when the images are formed using the fist liquid A for forming the image and the second liquid B in combination as shown in Table 2. When the ink liquid I and the ink liquid II are applied so as to overlap each other, the color density of the color applied under another color is also suppressed from being decreased with good color developability by using the polymer having a heterocyclic residue for forming a colorant, On the contrary, when a commercially available dispersing agent other than the polymer having a heterocyclic residue for forming a colorant (dispersing agent) is used as in ink-jet recording ink liquids I-1 and II-1 (comparative examples), the color density of the color applied under another color is decreases when the ink liquid I and the ink liquid II are applied so as to overlap each other, and good color developability could nor be obtained.

Ink-jet recording ink liquids I-1, I-2, I-3, I-4, II-1, II-2, II-3, II-4 and III-1 were effective for stabilizing ejection of the ink without being solidified by allowing the inks to remain filled in the nozzle. On the contrary, comparative inks I-0 and II-0 of one-liquid type was solidified when the inks remained filled in the nozzle.

Example 2

Ink-jet recording ink liquids containing no pigment (III-2, 3, 4 and 5) were prepared by the same method as in Example 1, except that bis{[1-ethyl(3-oxetanyl)]methyl}ether and 1-methyl-4-(2-methyloxylanyl)-7-oxabicyclo[4.1.0]heptane (trade name CEL 3000, manufactured by Daicel Cytec Company LTD.) used in the preparation of ink-jet recording ink liquid III-1 were changed to high boiling point organic solvents S-9, S-15, S-21 or S-32.

The ink liquids using S-9, S-15, S-21 or S-32 have sp vales of 17, 22, 19 and 19, respectively, and the surface tension was 23 mN/m for all the ink liquids.

Images were recorded and evaluated by the same method as in Example 1, except that the ink-jet recording ink liquid III-1 was changed to III-2, 3, 4 or 5. The results of evaluation showed that color mixing was favorably avoided, and the color density of the color applied under another color is also suppressed from being decreased with good color developability when the ink liquid I and the ink liquid II are applied so as to overlap to each other.

What is claimed is:

1. An ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment, a sp value of the second liquid B is 35 or less and the difference of the sp value between the first liquid A and the second liquid B is 10 or less, the polymer contains a repeating unit represented by formula (1):

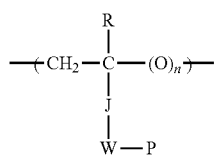

Formula (1)

wherein, in the formula, R represents a hydrogen atom or methyl group; J represents —CO—, —COO—, —CONR$^1$—, —OCO—, a methylene group or a phenylene group; R$^1$ represents a hydrogen atom, alkyl group, aryl group or aralkyl group; W represents a single bond or divalent linking group; P represents the heterocyclic residue for forming the colorant; and n denotes 0 or 1, the second liquid B further contains a lipophilic solvent, and the content of the lipophilic solvent is 50% by mass or more of the total mass of the second liquid B, the lipophilic solvent is a high boiling point organic solvent having a boiling point higher than 100° C., the ink set is an ultraviolet light curable ink set, and the high boiling point organic solvent is a compound represented by one of the formulae [S-1] to [S-9]:

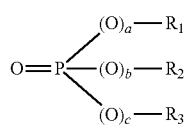

Formula [S-1]

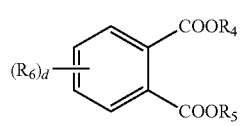

Formula [S-2]

Formula [S-3]

Formula [S-4]

Formula [S-5]

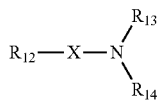

Formula [S-6]

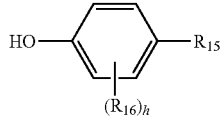

Formula [S-7]

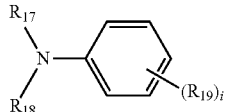

Formula [S-8]

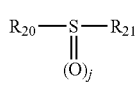

Formula [S-9]

wherein:

in formula [S-1], R$_1$, R$_2$, and R$_3$ each independently represents an aliphatic group or an aryl group, and a, b, and c each independently represents 0 or 1;

in formula [S-2], R$_4$ and R$_5$ each independently represents an aliphatic group or an aryl group, R$_6$ represents a halogen atom, an alkyl group, an alkoxy group, an aryloxy group, an alkoxycarbonyl group, or an aryloxycarbonyl group, and d represents an integral number of 0 to 3, provided that when d is two or more, a plurality of R$_6$s may be the same or different from each other;

in formula [S-3], Ar represents an aryl group, e represents an integer of 1 to 6, and R$_7$ represents a hydrocarbon group having a valence of e or hydrocarbon groups linked each other by an ether bond;

in formula [S-4], R$_8$ represents an aliphatic group, f represents an integer of 1 to 6, and R$_9$ represents a hydrocarbon group having a valence of f or hydrocarbon groups linked each other by an ether bond;

in formula [S-5], g represents an integer of 2 to 6, R$_{10}$ represents a hydrocarbon group having a valence of g (excluding an aryl group), and R$_{11}$, represents an aliphatic group or an aryl group;

in formula [S-6], R$_{12}$, R$_{13}$ and R$_{14}$ each independently represents a hydrogen atom, an aliphatic group, or an aryl group, X represents —CO— or —SO$_2$—, and R$_{12}$ and R$_{13}$ or R$_{13}$ and R$_{14}$ may be linked each other to form a ring;

in formula [S-7], R$_{15}$ represents an aliphatic group, an alkoxycarbonyl group, an aryloxycarbonyl group, an alkylsulfonyl group, an arylsulfonyl group, an aryl group or a cyano group, R$_{16}$ represents a halogen atom, an aliphatic group, an aryl group, an alkoxy group or an aryloxy group, h represents an integer of 0 to 3, provided that when h is two or more, a plurality of R$_{16}$s may be the same or different;

in formula [S-8], R$_{17}$ and R$_{18}$ each independently represents an aliphatic group or an aryl group, R$_{19}$ represents a halogen atom, an aliphatic group, an aryl group, an alkoxy group, or an aryloxy group, and i represents an integer of 0 to 5, provided that when i is two or more, a plurality of R$_{19}$s may be the same or different from each other;

in formula [S-9], $R_{20}$ and $R_{21}$ each independently represents an aliphatic group or an aryl group, j represents 1 or 2, and $R_{20}$ and $R_{21}$ may be linked each other to form a ring.

2. The ink-jet recording ink set of claim 1, wherein P in formula (1) is a group derived from at least one selected from the group consisting of quinacridone, benzimidazolone, indole, quinoline, carbazole, acridine, acridone and anthraquinone.

3. The ink-jet recording ink set of claim 1, wherein the polymer is a graft copolymer further containing, as a copolymerization unit, a repeating unit derived from a polymerizable oligomer (macro-monomer) having an ethylenic unsaturated double bond at a terminal thereof.

4. The ink-jet recording ink set of claim 1, wherein the first liquid A contains at least a polymerizable compound or crosslinkable compound.

5. The ink-jet recording ink set of claim 4, wherein the second liquid B contains a polymerization initiator for permitting at least the polymerizable compound or crosslinkable compound to undergo a polymerizing or crosslinking reaction.

6. The ink-jet recording ink set of claim 1, wherein the second liquid B contains no colorant, or the content of the colorant is less than 1%.

7. The ink-jet recording ink set of claim 1, wherein the high boiling point organic solvent is a compound represented by one of the formulae [S-1], [S-2], [S-3], and [S-5].

8. The ink-jet recording ink set of claim 1, wherein the high boiling point organic solvent is compound S-9, S-15, S-21, or S-32 shown below:

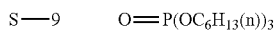
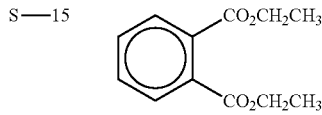
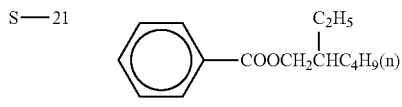

9. An ink-jet recording method using an ink-jet recording ink set comprising at least one first liquid A for at least forming an image and at least one second liquid B having a different composition from the composition of the first liquid A, wherein the first liquid A contains at least a polymer having a heterocyclic residue for forming a colorant, and a pigment, a sp value of the second liquid B is 35 or less and the difference of the sp value between the first liquid A and the second liquid B is 10 or less, the polymer contains a repeating unit represented by formula (1):

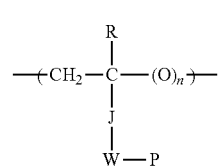

Formula (1)

wherein, in the formula, R represents a hydrogen atom or methyl group; J represents —CO—, —COO—, —CONR$^1$—, —OCO—, a methylene group or a phenylene group; R$^1$ represents a hydrogen atom, alkyl group, aryl group or aralkyl group; W represents a single bond or divalent linking group; P represents the heterocyclic residue for forming the colorant; and n denotes 0 or 1, the second liquid B further contains a lipophilic solvent, and the content of the lipophilic solvent is 50% by mass or more of the total mass of the second liquid B, the lipophilic solvent is a high boiling point organic solvent having a boiling point higher than 100° C., the ink set is an ultraviolet light curable ink set, and the high boiling point organic solvent is a compound represented by one of the formulae [S-1] to [S-9]:

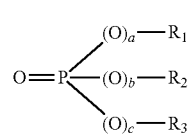

Formula [S-1]

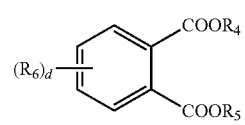

Formula [S-2]

Formula [S-3]

Formula [S-4]

Formula [S-5]
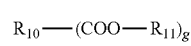

Formula [S-6]
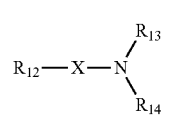

Formula [S-7]
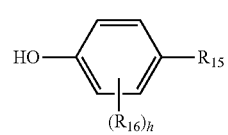

Formula [S-8]
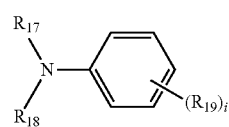

Formula [S-9]
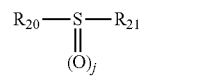

wherein:

in formula [S-1], $R_1$, $R_2$, and $R_3$ each independently represents an aliphatic group or an aryl group, and a, b, and c each independently represents 0 or 1;

in formula [S-2], $R_4$ and $R_5$ each independently represents an aliphatic group or an aryl group, $R_6$ represents a halogen atom, an alkyl group, an alkoxy group, an aryloxy group, an alkoxycarbonyl group, or an aryloxycarbonyl group, and d represents an integral number of 0 to 3, provided that when d is two or more, a plurality of $R_6$s may be the same or different from each other:

in formula [S-3], Ar represents an aryl group, e represents an integer of 1 to 6, and $R_7$ represents a hydrocarbon group having a valence of e or hydrocarbon groups linked each other by an ether bond;

in formula [S-4], $R_8$ represents an aliphatic group, f represents an integer of 1 to 6, and $R_9$ represents a hydrocarbon group having a valence of f or hydrocarbon groups linked each other by an ether bond;

in formula [S-5], g represents an integer of 2 to 6, $R_{10}$ represents a hydrocarbon group having a valence of g (excluding an aryl group), and $R_{11}$ represents an aliphatic group or an aryl group;

in formula [S-6], $R_{12}$, $R_{13}$ and $R_{14}$ each independently represents a hydrogen atom, an aliphatic group, or an aryl group, X represents —CO— or —$SO_2$—, and $R_{12}$ and $R_{13}$ or $R_{13}$ and $R_{14}$ may be linked each other to form a ring;

in formula [S-7], $R_{15}$ represents an aliphatic group, an alkoxycarbonyl group, an aryloxycarbonyl group, an alicylsulfonyl group, an arylsulfonyl group, an aryl group or a cyano group, $R_{16}$ represents a halogen atom, an aliphatic group, an aryl group, an alkoxy group or an aryloxy group, h represents an integer of 0 to 3, provided that when h is two or more, a plurality of $R_{16}$s may be the same or different;

in formula [S-8], $R_{17}$ and $R_{18}$ each independently represents an aliphatic group or an aryl group, $R_{19}$ represents a halogen atom, an aliphatic group, an aryl group, an alkoxy group, or an aryloxy group, and i represents an integer of 0 to 5, provided that when i is two or more, a plurality of $R_{19}$s may be the same or different from each other;

in formula [S-9], $R_{20}$ and $R_{21}$ each independently represents an aliphatic group or an aryl group, j represents 1 or 2, and $R_{20}$ and $R_{21}$ may be linked each other to form a ring, the method comprising applying the second liquid B on an area corresponding to the image to be formed on a recording medium with the first liquid A or an area wider than the area corresponding to the image, before application of the first liquid A.

10. The ink-jet recording method of claim 9, wherein at least a droplet a1 and a droplet a2 of the first liquid A are applied to form the image, wherein the droplet a1 and the droplet a2 have overlap portion with respect to each other.

11. The ink-jet recording method of claim 10, wherein the overlap ratio at the overlap portion is in the range of 10% to 90%.

12. The ink-jet recording method of claim 9, wherein a time interval between finishing of the application of the second liquid B and starting of the application of a droplet a1 of the first liquid A is in the range of 5 μsec to 400 msec.

13. The ink-jet recording method of claim 9, wherein the size of droplets of the first liquid A including a droplet a1 and a droplet a2 is in the range of 0.1 picoliters to 100 picoliters.

14. The ink-jet recording method of claim 9, wherein the second liquid B is maintained in a liquid state until application of the first liquid A.

15. The ink-jet recording method of claim 9, wherein at least one of the first liquid A and the second liquid B contains a polymerizable compound or crosslinkable compound, and the polymerizable compound or crosslinkable compound is polymerized or crosslinked by applying activation energy to the image after applying droplets of the first liquid A.

16. The ink-jet recording method of claim 9, wherein the high boiling point organic solvent is a compound represented by one of the formulae [S-1], [S-2], [S-3], and [S-5].

17. The ink-jet recording method of claim 9, wherein the high boiling point organic solvent is compound S-9, S-15, S-21, or S-32 shown below:

S—9    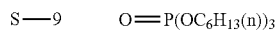

S—15   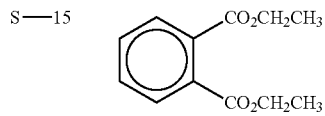

S—21   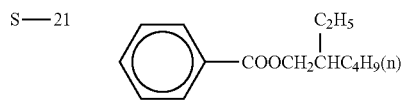

S—32   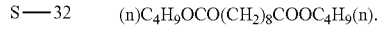

* * * * *